United States Patent
Keller et al.

(10) Patent No.: US 11,231,055 B1
(45) Date of Patent: Jan. 25, 2022

(54) APPARATUS AND METHODS FOR FLUIDIC AMPLIFICATION

(71) Applicant: Facebook Technologies, LLC, Menlo Park, CA (US)

(72) Inventors: Sean Jason Keller, Bellevue, WA (US); Andrew Arthur Stanley, Seattle, WA (US); Jack Lindsay, Seattle, WA (US); Casey Glick, Redmond, WA (US); Erik Roby, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 48 days.

(21) Appl. No.: 16/432,788

(22) Filed: Jun. 5, 2019

(51) Int. Cl.
*G06F 3/01* (2006.01)
*F15C 1/14* (2006.01)

(52) U.S. Cl.
CPC ............... *F15C 1/14* (2013.01); *G06F 3/014* (2013.01); *G06F 3/016* (2013.01); *Y10T 137/2147* (2015.04)

(58) Field of Classification Search
CPC . F15C 1/14; G06F 3/014; G06F 3/016; Y10T 137/2147
USPC .......................................................... 137/819
See application file for complete search history.

(56) References Cited

U.S. PATENT DOCUMENTS

| | | | | |
|---|---|---|---|---|
| 3,417,769 A | * | 12/1968 | Bjornsen | F15C 1/20 137/816 |
| 3,468,324 A | * | 9/1969 | Schrader | F15C 1/146 137/816 |
| 3,469,592 A | * | 9/1969 | Kuczkowski | F15C 1/20 137/816 |
| 3,570,511 A | * | 3/1971 | Bermel | F15C 1/146 137/818 |
| 3,592,383 A | * | 7/1971 | Ringwall | F15C 1/146 235/200 PF |
| 3,674,140 A | * | 7/1972 | File | B65B 57/10 209/559 |
| 3,705,595 A | * | 12/1972 | Laakaniemi | F15B 5/003 137/824 |
| 3,752,171 A | * | 8/1973 | Ayre | F15C 1/12 137/1 |

(Continued)

OTHER PUBLICATIONS

Pacchierotti et al., "Wearable Haptic Systems for the Fingertip and the Hand: Taxonomy, Review, and Perspectives", IEEE Transactions on Haptics, vol. 10, No. 4, May 9, 2017, pp. 580-600.

(Continued)

*Primary Examiner* — William M Mccalister
(74) *Attorney, Agent, or Firm* — FisherBroyles, LLP

(57) ABSTRACT

In some examples, a device includes a first fluidic amplifier stage, configured to receive a fluidic input and provide a first stage fluidic output, and a second fluidic amplifier stage, configured to receive the first stage fluidic output and provide a second stage fluidic output. The first fluidic amplifier stage may include a fluidic valve, for example having a source, a gate, and a drain. The fluidic input may be connected to the gate of the fluidic valve through a fluid channel, and a fluid flow between the source and the drain of the fluidic valve may be controlled by the fluidic input. An example device may be configured to provide a fluidic output, wherein the fluidic output is based on the fluidic input, and the fluidic output may be provided to a fluidic load such as an actuator.

14 Claims, 21 Drawing Sheets

(56) References Cited

U.S. PATENT DOCUMENTS

| | | | | |
|---|---|---|---|---|
| 3,770,021 | A | * | 11/1973 | Garner .................. F15C 1/00 |
| | | | | 137/819 |
| 3,788,357 | A | * | 1/1974 | Welk, Jr. ................ F15C 1/00 |
| | | | | 137/805 |
| 3,926,221 | A | * | 12/1975 | Woods .................... F15C 1/14 |
| | | | | 137/819 |
| 3,991,790 | A | * | 11/1976 | Russell ................ A61M 16/00 |
| | | | | 137/819 |
| 4,019,697 | A | * | 4/1977 | Tippetts ................ B64D 37/00 |
| | | | | 244/78.2 |
| 4,244,391 | A | * | 1/1981 | Coudeyre ................ F15C 3/04 |
| | | | | 137/119.02 |
| 4,572,331 | A | * | 2/1986 | Powell .................... F16N 25/02 |
| | | | | 137/624.18 |
| 4,848,722 | A | | 7/1989 | Webster |
| 6,406,605 | B1 | | 6/2002 | Moles |
| 6,461,335 | B1 | | 10/2002 | Noecker |
| 6,474,623 | B1 | | 11/2002 | Davies |
| 6,823,895 | B2 | | 11/2004 | Hitchcock et al. |
| 6,949,176 | B2 | | 9/2005 | Vacca et al. |
| 7,138,976 | B1 | | 11/2006 | Bouzit et al. |
| 8,844,570 | B2 | | 9/2014 | Glick |
| 8,922,355 | B2 | | 12/2014 | Kusuura |
| 9,132,425 | B2 | | 9/2015 | Wen et al. |
| 9,371,965 | B2 | | 6/2016 | Devaraju et al. |
| 2002/0014607 | A1 | | 2/2002 | Abromaitis |
| 2002/0158217 | A1 | | 10/2002 | Inoue et al. |
| 2002/0195152 | A1 | * | 12/2002 | Fernandes .......... F16K 99/0059 |
| | | | | 137/803 |
| 2003/0010946 | A1 | | 1/2003 | Furukawa et al. |
| 2003/0141470 | A1 | | 7/2003 | Igarashi |
| 2003/0196695 | A1 | | 10/2003 | O'Connor et al. |
| 2004/0033108 | A1 | | 2/2004 | Raftis et al. |
| 2004/0056220 | A1 | | 3/2004 | Raftis |
| 2004/0118646 | A1 | | 6/2004 | Lun |
| 2005/0049546 | A1 | | 3/2005 | Messerly et al. |
| 2006/0058740 | A1 | | 3/2006 | Cise et al. |
| 2006/0163506 | A1 | | 7/2006 | Cook et al. |
| 2006/0243934 | A1 | | 11/2006 | Chung et al. |
| 2007/0170382 | A1 | | 7/2007 | Li et al. |
| 2007/0181835 | A1 | | 8/2007 | Hanada |
| 2008/0087853 | A1 | | 4/2008 | Kees |
| 2008/0264863 | A1 | | 10/2008 | Quake et al. |
| 2009/0007969 | A1 | | 1/2009 | Gundel |
| 2009/0121166 | A1 | | 5/2009 | Gabelgaard |
| 2009/0145502 | A1 | | 6/2009 | Dirac et al. |
| 2009/0302244 | A1 | | 12/2009 | Wedel |
| 2010/0093559 | A1 | | 4/2010 | Fan et al. |
| 2010/0108167 | A1 | * | 5/2010 | Kidd ........................ F04F 5/467 |
| | | | | 137/819 |
| 2010/0170572 | A1 | | 7/2010 | Sahoo et al. |
| 2010/0180970 | A1 | | 7/2010 | Welle |
| 2010/0228222 | A1 | | 9/2010 | Williams et al. |
| 2010/0260617 | A1 | | 10/2010 | Haertl |
| 2010/0261137 | A1 | | 10/2010 | Boyd et al. |
| 2011/0045599 | A1 | | 2/2011 | Erickson et al. |
| 2011/0254672 | A1 | | 10/2011 | Ciesla et al. |
| 2012/0039770 | A1 | | 2/2012 | Namkoong et al. |
| 2012/0182135 | A1 | | 7/2012 | Kusuura |
| 2012/0275929 | A1 | | 11/2012 | Salsman |
| 2013/0037149 | A1 | * | 2/2013 | Wen ......................... F15C 1/04 |
| | | | | 137/803 |
| 2013/0156615 | A1 | | 6/2013 | Puleo et al. |
| 2013/0234054 | A1 | | 9/2013 | Eijkelenberg et al. |
| 2014/0062954 | A1 | | 3/2014 | Ciesla et al. |
| 2014/0130920 | A1 | | 5/2014 | Fernandes et al. |
| 2014/0134001 | A1 | | 5/2014 | Uchida et al. |
| 2016/0228889 | A1 | | 8/2016 | Maruyama et al. |
| 2016/0238040 | A1 | | 8/2016 | Gallo et al. |
| 2016/0258543 | A1 | | 9/2016 | Van Den Bijgaart et al. |
| 2016/0363997 | A1 | | 12/2016 | Black et al. |
| 2017/0203028 | A1 | | 7/2017 | Carr et al. |
| 2017/0300115 | A1 | | 10/2017 | Kerr et al. |
| 2018/0018858 | A1 | | 1/2018 | Provancher et al. |
| 2018/0038513 | A1 | | 2/2018 | Baldea et al. |
| 2018/0209562 | A1 | | 7/2018 | Keller et al. |
| 2019/0063619 | A1 | | 2/2019 | Keller et al. |
| 2019/0212824 | A1 | | 7/2019 | Keller et al. |

OTHER PUBLICATIONS

Sochol et al., "3D printed microfluidic circuitry via multijet-based additive manufacturing", Lab on a Chip, vol. 16, Jan. 4, 2016, pp. 668-678.

Gottmann et al., "Digital photonic production of micro structures in glass by in-volume selective laser-induced etching using a high speed micro scanner", ScienceDirect, Physics Procedia, vol. 39, Nov. 10, 2012, pp. 534-541.

Gottmann et al., "Selective Laser-Induced Etching of 3D Precision Quartz Glass Components for Microfluidic Applications—Up-Scaling of Complexity and Speed", MDPI, Micromachines, vol. 8, No. 4, Article 110, Apr. 1, 2017, pp. 1-10.

Hermans et al., "Selective, Laser-Induced Etching of Fused Silica at High Scan-Speeds Using KOH", JLMN—Journal of Laser Micro/Nanoengineering, vol. 9, No. 2, Jan. 6, 2014, pp. 126-131.

Frank et al., "Integrated Microfluidic Membrane Transistor Utilizing Chemical Information for On-Chip Flow Control", PLoS One, vol. 11, No. 8, Aug. 29, 2016, pp. 1-17.

Eddington et al., "Flow control with hydrogels", ScienceDirect, Advanced Drug Delivery Reviews, vol. 56, No. 2, Feb. 10, 2004, pp. 199-210.

Grayson et al., "A BioMEMS Review: MEMS Technology for Physiologically Integrated Devices", Proceedings of the IEEE, vol. 92, No. 1, Nov. 8, 2004, pp. 6-21.

Mohan et al., "Design considerations for elastomeric normally closed microfluidic valves", ScienceDirect, Sensors and Actuators B: Chemical, vol. 160, No. 1, Dec. 15, 2011, pp. 1216-1223.

Perdigones et al., "Correspondence Between Electronics and Fluids in MEMS: Designing Microfluidic Systems Using Electronics", IEEE Industrial Electronics Magazine, vol. 8, No. 4, Dec. 12, 2014, 12 pages.

Zhang et al., "Microfluidic Passive Flow Regulatory Device with an Integrated Check Valve for Enhanced Flow Control", MDPI, Micromachines, vol. 10, No. 10, Article 653, Sep. 27, 2019, pp. 1-12.

Thorsen et al., "Microfluidic Large-Scale Integration", Science, vol. 298, Issue 5593, Oct. 18, 2002, pp. 580-584.

Rinderknecht et al., "Combined Tendon Vibration and Virtual Reality for Post-Stroke Hand Rehabilitation", IEEE World Haptics Conference (IEEE WHC), Apr. 14, 2013, 6 pages.

Provancher et al., "Tactile Perception of Rotational Sliding", Second Joint EuroHaptics Conference and Symposium on Haptic Interfaces for Virtual Environment and Teleoperator Systems (WHC'07), Mar. 22, 2007, 6 pages.

* cited by examiner

APPARATUS AND METHODS FOR FLUIDIC AMPLIFICATION

BACKGROUND

Fluidic devices may be used to control the flow and pressure of fluids. It would be useful to have improved pressure and flow control of fluids in fluidic applications.

SUMMARY

As will be described in greater detail below, the instant disclosure describes fluidic devices, systems, and methods. In some examples, a fluidic device provides a fluidic output (which may include an output pressure and/or output flow rate) that may be approximately linearly dependent on a fluidic input (such as an input pressure and/or input flow rate). In other examples, the output may be semi-proportional to the input, or may saturate to a maximum or minimum available pressure (e.g., act as a fluidic switch).

A fluidic amplifier stage may include one or more fluidic valves. An example fluidic valve includes a source, a gate, and a drain. In a fluidic valve, a flow rate from the source to the drain and/or a pressure between the source and the drain may be controlled by a gate pressure and/or a gate flow applied to the gate. A fluidic amplifier stage may include a fluidic resistor, which provides a flow impedance to a flow therethrough. A fluidic resistor may include one or more orifices. In some examples a fluidic input is applied to the gate of a fluidic valve, for example through a fluid channel and an input fluid resistor, and a fluidic output is obtained between the fluidic valve and a fluidic resistor. A fluidic amplifier may increase the pressure and/or flow from a fluidic input to a fluidic output (e.g., to a fluidic load). A fluidic amplifier may increase the flow rate to an output (compared with a flow rate without the amplifier), and may greatly decrease the time taken to drive the load from a given input.

In some examples, a device may include a first fluidic amplifier stage configured to receive a fluidic input and provide a first stage fluidic output, and a second fluidic amplifier stage, configured to receive the first stage fluidic output and provide a second stage fluidic output. The first fluidic amplifier stage may include a fluidic valve. A fluidic valve may include a source, a gate, and a drain. The device may include one or more additional fluidic amplifier stages, and each fluidic amplifier stage may include one or more fluidic valves. A fluidic input may be connected to the gate through a fluid channel, and a fluid flow between the source and the drain may then be controlled by the fluidic input. A device may also include a fluidic load, such as an actuator, for example a haptic device. A load may comprise a pressure storage device, such as a balloon, cylinder, or other pressure-driven actuator. A load may also include a leakage and/or drainage component, and may have a load resistance. The fluidic load may receive a fluidic output from a fluidic amplifier, which may for example be the second stage fluidic output, or other signal based on the fluidic input signal. A device may further include a third fluidic amplifier stage, configured to receive the second stage fluidic output and provide a third stage fluidic output. A fluidic load may receive the third stage fluidic output, or the output of any amplifier stage.

In some examples, a fluidic amplifier stage includes a first fluidic valve comprising a first source, a first gate, and a first drain, and a second fluidic valve comprising a second source, a second gate, and a second drain. A fluidic input may be applied both to the first gate and the second gate, and the fluidic output is obtained between the first drain and the second source. The first fluidic valve may be a normally open fluidic valve, and the second fluidic valve may be a normally closed fluidic valve. In some examples, a fluidic amplifier stage may include one or more normally open fluidic valves.

In some cases, the first normally open fluidic valve and the second normally closed fluidic valve are both elements of a single complementary fluidic valve. In some example, a complementary valve may function in a similar manner to a pair of individual fluidic valves. A complementary valve may include the functionality of first and second fluidic valves, and include an external source connection to the first fluidic valve, an external drain connection from the second fluidic valve, and may include an internal channel that provides an internal drain for the first fluidic valve, an internal source for the second fluidic valve, and optionally an output connection which may be provided from the internal channel between the first and second fluidic valves.

A fluidic input may be received through a fluidic input circuit, which may include a fluidic resistor, such as an aperture, constricted flow channel, or other flow restrictor. A fluidic output may be provided to a fluidic load, which may include a device, such as an actuator, for example, a haptic device. In some examples, a fluidic device includes an input fluidic amplifier stage configured to receive the fluidic input from the fluidic input stage and provide a first stage fluidic output, and an output fluidic amplifier stage configured to receive a fluidic signal based on the first stage fluidic output and provide a fluidic output (e.g., to a fluidic load). In some examples, there may be one or more additional fluid amplifier stages, for example one or more intermediate fluidic amplifier stages configured to receive a fluidic output from an earlier amplifier stage, such as the input fluidic amplifier stage, and to provide a fluidic signal output to a later fluidic amplifier stage, such as the output fluidic amplifier stage.

In some examples, a fluidic amplifier stage comprises a fluidic valve (comprising a source, a gate, and a drain), and a fluidic resistor, wherein the amplifier stage is configured so that a fluidic input is received at the gate, and a stage fluidic output is obtained between the first fluidic valve and the fluidic resistor. In some examples, a fluidic amplifier stage comprises a pair of fluidic valves (each fluidic valve comprising a source, a gate, and a drain) wherein a fluidic input is received at the gate of each fluidic valve, and a fluidic output is obtained between the pair of fluidic valves (e.g., between the drain of one fluidic valve and the source of the other fluidic valve). In some examples, a fluidic amplifier stage includes a normally open fluidic valve and a normally closed fluidic valve. A fluidic device may include a fluidic input stage configured to receive a fluidic input, and a fluidic output stage through which the fluidic output passes. A fluidic input stage may include an aperture, or may receive a fluidic input through an external aperture. A fluidic load may include an actuator, for example a haptic device. A haptic device may provide a perceivable tactile sensation to a user, such as a pressure, vibration, change in texture, or the like.

In some examples, a method includes receiving (by a fluidic amplifier stage) a fluidic input and then amplifying the fluidic input using the fluidic amplifier stage to provide a fluidic output. This fluidic output may then be amplified by one or more additional fluidic amplifier stages, which may include a fluidic output stage that provides a fluidic output, for example to a fluidic load such as a haptic device. An example method may be a method of driving a haptic device using one or more fluidic amplifier stages, such as, for example, using a fluidic amplifier stage fluidically coupled to a fluidic output stage. An example method may include driving an actuator using a fluidic output. In some examples, a fluidic output has a flow rate and/or pressure appreciably larger than the first stage fluidic output, for example at least approximately double the input flow rate, and in some examples at least approximately 10 times the input flow rate. In some examples, a method includes amplifying a fluidic input using a fluidic amplifier stage that includes at least one normally open fluidic valve.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
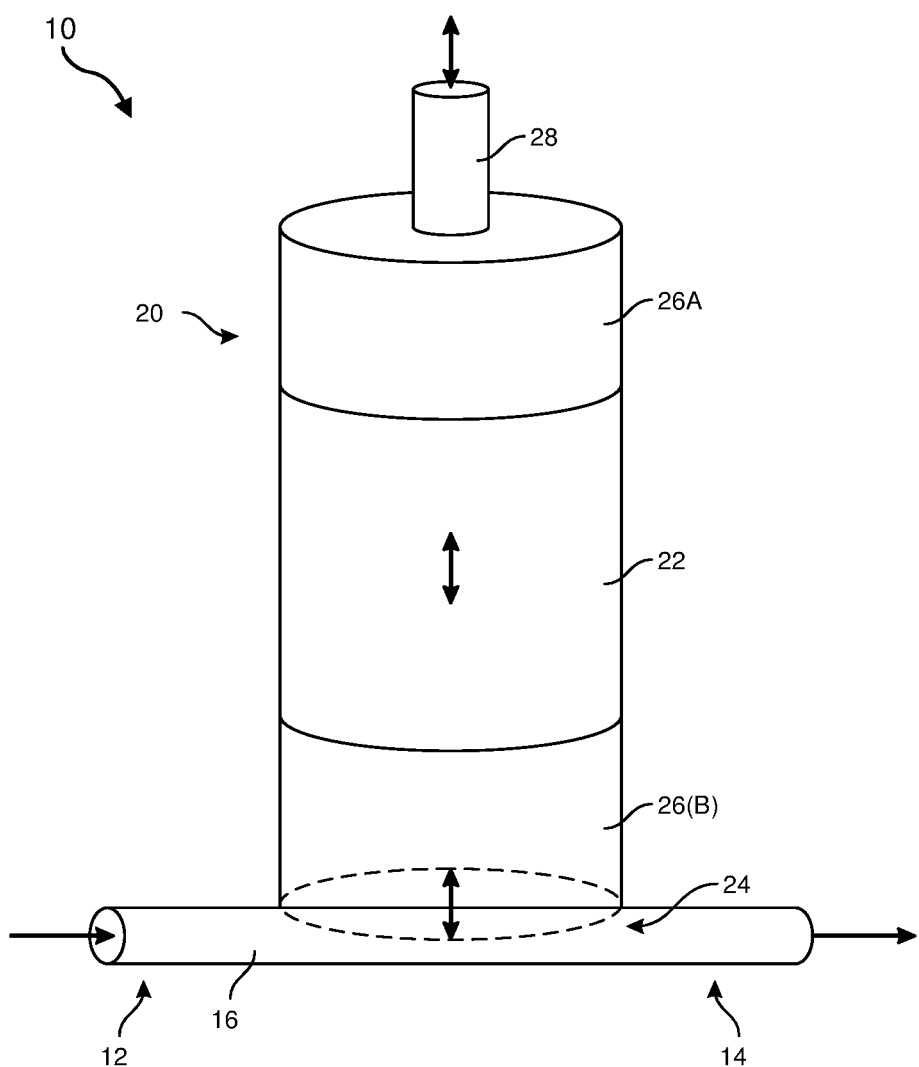
FIG. 1A depicts an example fluidic valve in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to fluidic devices, for example fluidic circuits such as fluidic amplifiers. As will be explained in greater detail below, embodiments of the instant disclosure may include a fluidic amplifier that receives a fluidic input (e.g., including an input pressure and/or an input flow rate) and provides a fluidic output (e.g., including an output pressure and/or an output flow rate). The fluidic output may be provided to a fluidic load, which may include an actuator such as a haptic device. The haptic device may have a drain that is directed back through the fluidic amplifier, or through a separate connection to a system drain. In this context, a system drain may receive fluid flow from a fluidic device, such as a fluidic amplifier, or any other system components such as a fluidic load or input signal generator.

Figure 1B:
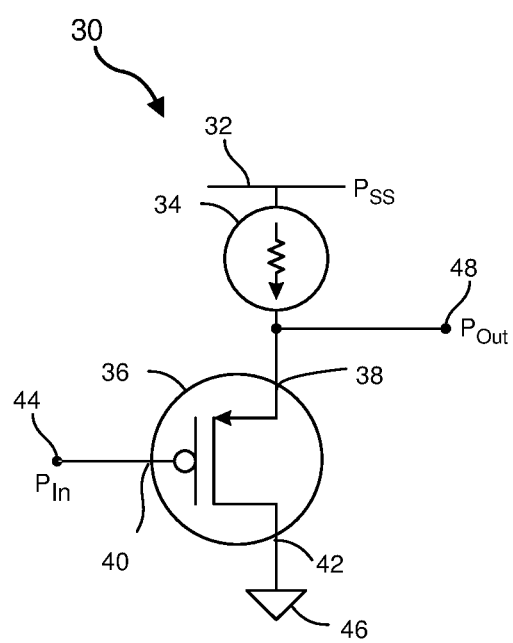
FIG. 1B depicts a fluidic schematic drawing showing a fluidic circuit including an example fluidic valve, in accordance with some embodiments.
Figure 2A:
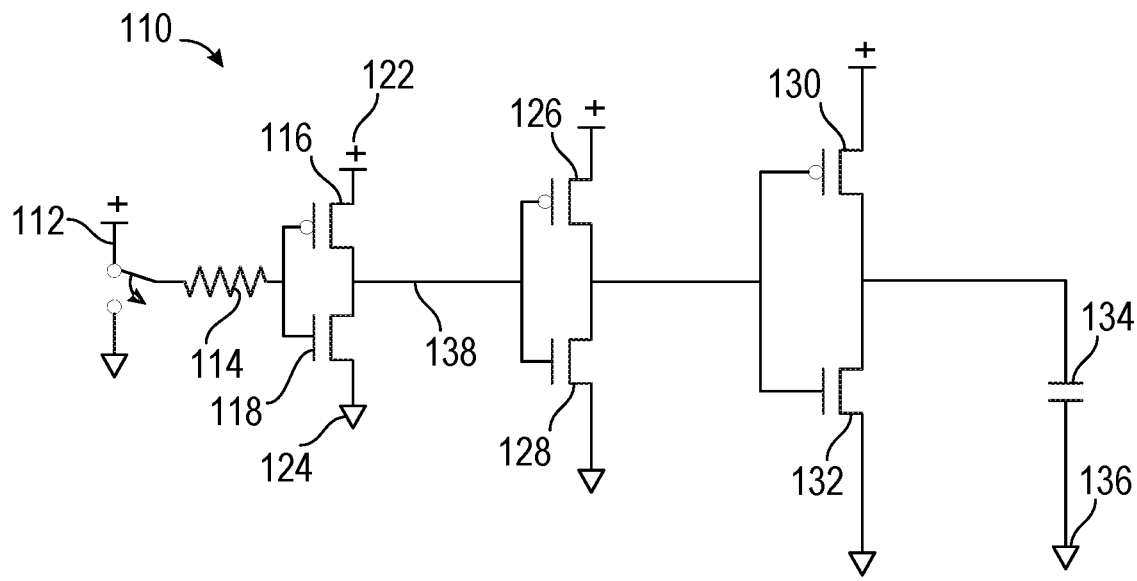
FIGS. 2A-2B depicts fluidic amplifiers having fluidic amplifier stages based on fluidic valves, according to some embodiments.
Figure 2B:
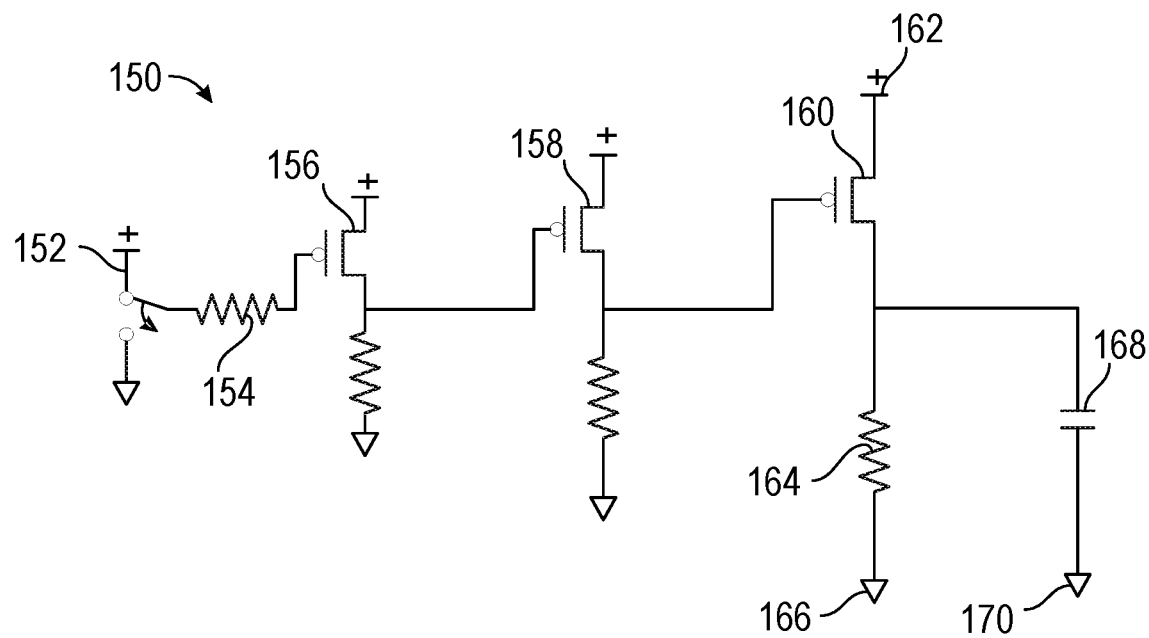
Figure 3:
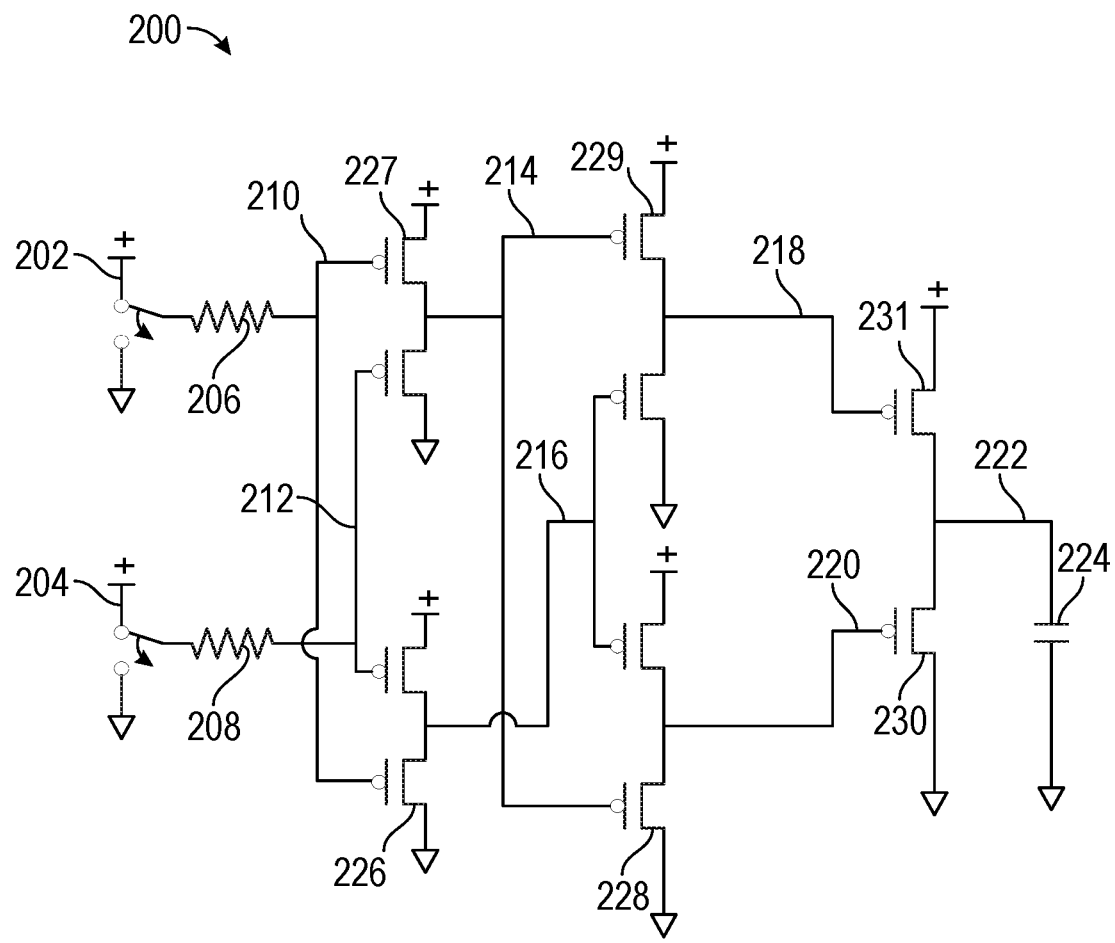
FIG. 3 depicts a fluidic amplifier according to some embodiments.
Figure 5:
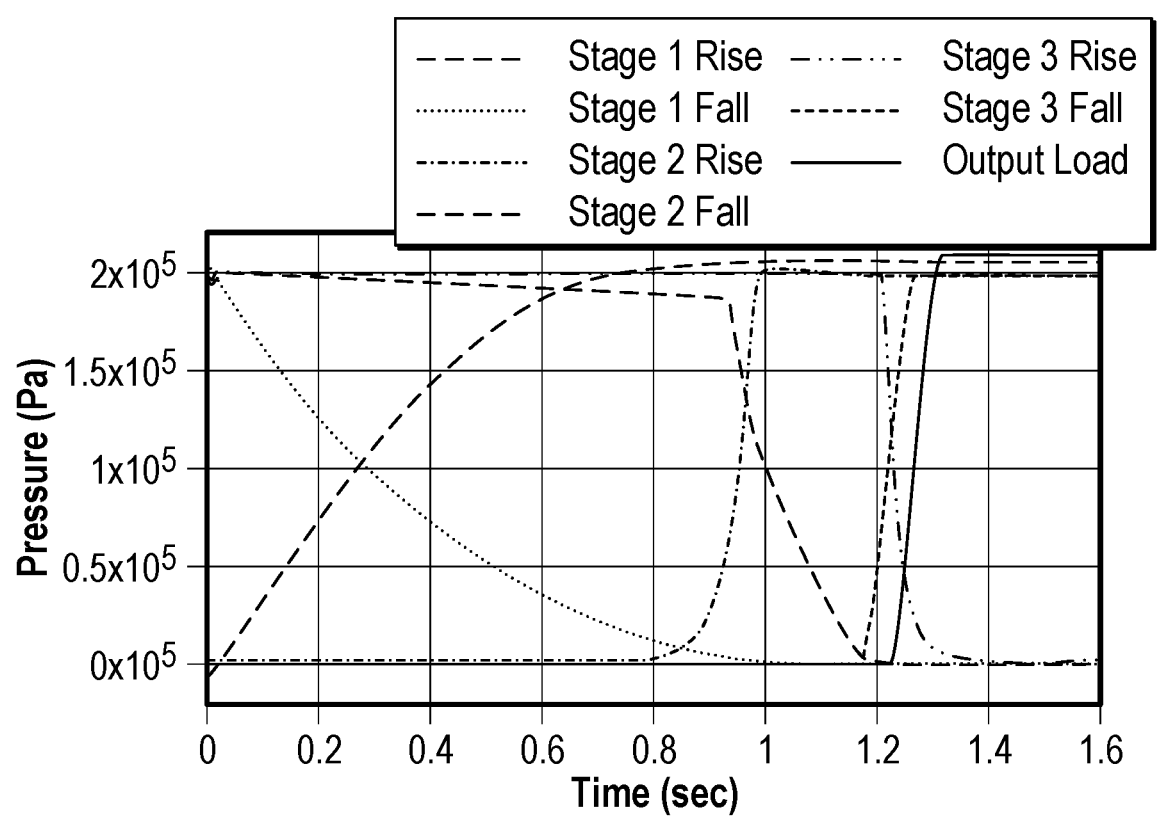
FIG. 5 depicts response times of fluidic signals within a fluidic amplifier having multiple amplifier stages, according to some embodiments.
Figure 6:
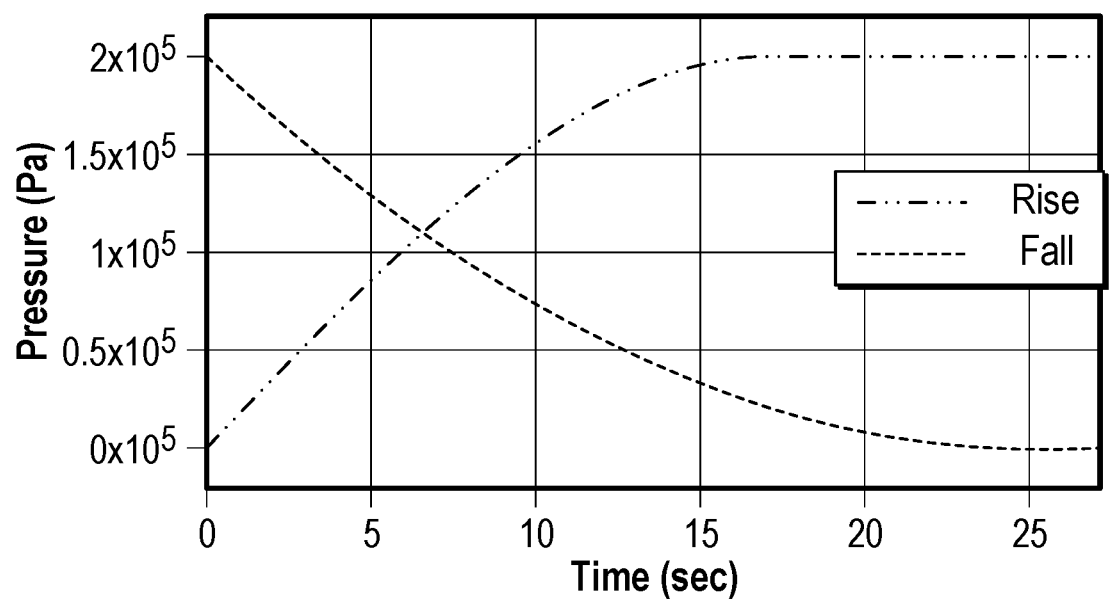
FIG. 6 depicts response times of fluidic signals using direct drive, for comparison with the response times of a fluidic amplifier.
Figure 7:
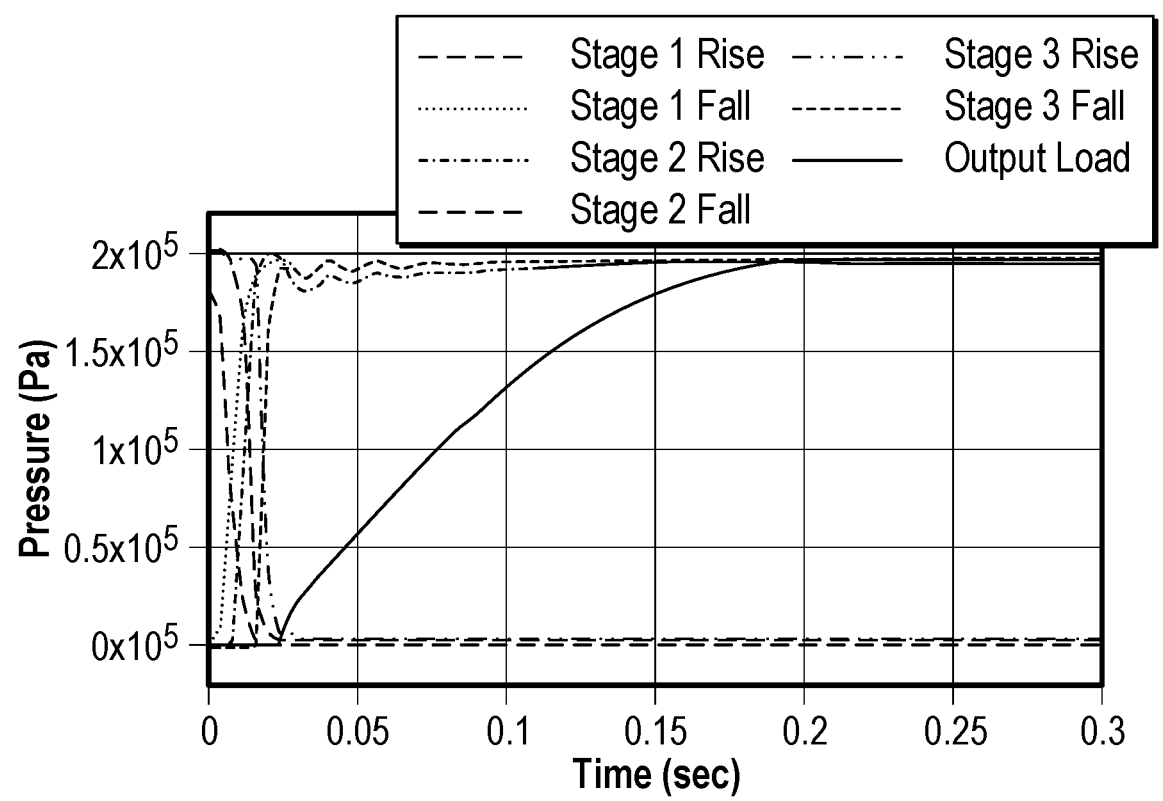
FIG. 7 depicts simulated response times of fluidic signals within a fluidic amplifier having multiple amplifier stages, according to some embodiments.

The following will provide, with reference to FIGS. 1-20, detailed descriptions of devices, systems, and methods based on fluidic components, such as fluidic valves. For example, FIG. 1A shows a representation of an example fluidic valve, and FIG. 1B shows a representative fluidic circuit schematic. FIGS. 2A, 2B, and 3 show examples of a fluidic circuit, which may be described as a fluidic exponential horn that may provide appreciable flow and/or pressure amplification of a fluidic signal. This configuration may allow a large fluidic load (e.g., large reservoir) to be pressurized quickly based on activation of a relatively small control valve (e.g., a control valve having a high input resistance and low flow rate). In some examples, a control valve may be a component of to a fluidic valve. FIGS. 5-7 show example response time data. FIGS. 8-12 show further example fluidic devices, systems, and methods. FIGS. 13-20 illustrate various example applications in, for example, haptics, augmented reality (AR), and/or virtual reality (VR).

For example, a fluidic load may be pressurized or otherwise actuated using direct drive by, for example, connecting a control valve directly to the load. A fluidic load may be, or include, a fluidic resistor. This approach may be relatively slow, as discussed below in more detail below, in particular in relation to FIG. 7. Alternatively, in a direct drive approach, the control valve may be physically large to obtain sufficiently high flow rates through the control valve. This limits the possible locations and sensitivity of the control valve.

In some examples, a fluidic amplifier includes amplifier stages configured by for example chaining a series of switches that grow slightly larger at each amplifier stage (such as fluidic valves having, e.g., increasing dimensions). The flow rate may increase at each amplifier stage, and a pressure response time at the output may be obtained that is appreciably faster than using a direct drive approach with the same fluidic input. Each fluidic amplifier stage may include one or more fluidic valves, which may be configured as a fluidic inverting amplifier. Example fluidic amplifiers may have a configuration comparable to electrical circuits such as, for example, resistor-transistor logic, pFET-nFET logic, dual pFET logic, or cFET logic. In some examples, an exponential horn may include one or more complimentary fluidic valves. A fluidic circuit, which may include one or more fluidic valves (e.g., one or more complementary fluidic valves) allows interfacing between a restricted control input and a large load. For example, a fluidic input may have a relatively small flow rate, compared with the available output flow rate to a fluidic load. In some examples, the output flow rate may be at least ten times the input flow rate. In some examples, a physically small fluidic valve (e.g., having an exterior dimension of less than 10 cm) may be used to drive a relatively large fluidic load. In some examples, an electronic control system may be used to, for example, control and/or monitor one or more fluidic valves, generate or otherwise help provide a fluidic input, monitor one or more sensors (e.g., pressure or flow sensors associated with a fluidic circuit, or any type of sensor which may provide a sensor reading on which a fluidic signal may be based). In some applications, an electronic control system may be small, low power, and/or fast. An electronic control system may be a component of an augmented reality (AR) or virtual reality (VR) system, or component thereof. A fluidic circuit (e.g., an exponential horn fluidic circuit) may have an output that is approximately saturated (e.g., at approximately a maximum or minimum available pressure), based on the input signal. In some examples, a fluidic circuit may provide a mechanical latch, or mechanical jammer. In some examples, an exponential horn fluidic circuit may have an output that is approximately proportional or semi-proportional to an input (e.g., an output flow rate and/or pressure that is approximately proportional or semi-proportional to an input flow rate and/or pressure). In some examples, a fluidic output may be used to drive an actuator, for example to push back on an object with a known amount of force. Examples include robotic control systems and automated equipment, for example using flow rate or pressure to inflate a device, apply pressure, provide resistance, provide a haptic sensation, and the like. In some examples, a surface may have a perceived hardness that is controllable by a controllable pressure fluid provided by a fluidic circuit. For example, an input fluidic signal may be used to control an output fluidic signal, and the output fluidic signal may be used to apply (or provide) an applied pressure in a manner which may be approximately proportional to the input fluidic signal. Fluidic circuits, such as exponential horn fluidic circuits, may also be used as fluidic amplifiers, latch circuits, haptic signal providers, and the like.

FIG. 1A is an illustration of an exemplary fluidic control system that may be used in connection with embodiments of this disclosure, which may be termed a fluidic valve. Examples of the present disclosure may include fluidic devices, systems, and methods that involve the control (e.g., stopping, starting, restricting, increasing, etc.) of fluid flow through a fluid channel. A fluid channel may sometimes be referred to as a conduit. The control of fluid flow may be accomplished with a fluidic valve. FIG. 1A shows a schematic diagram of a fluidic valve 10 for controlling flow through a fluid channel 16, according to at least one embodiment of the present disclosure. Fluid from a fluid source (e.g., a pressurized fluid source, a fluid pump, etc.) may flow through the fluid channel 16 from an inlet port 12 to an outlet port 14, which may be operably coupled to, for example, a fluid-driven mechanism, another fluid channel, or a fluid reservoir. In some examples, an inlet port may be referred to a fluidic valve source (or "source"), and an outlet port may be referred to as a fluidic valve drain (or "drain").

Fluidic valve 10 may include a gate 20 for controlling the fluid flow through fluid channel 16. Gate 20 may include a gate transmission element 22, which may be a movable component that is configured to transmit an input force, pressure, or displacement to a restriction region 24 to restrict or stop flow through the fluid channel 16. Conversely, in some examples, application of a force, pressure, or displacement to gate transmission element 22 may result in opening restriction region 24 to allow or increase flow through the fluid channel 16. The force, pressure, or displacement applied to gate transmission element 22 may be referred to as a gate force, gate pressure, or gate displacement. Gate transmission element 22 may include a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

In some examples, a gate transmission element may be referred to as a "valve". For example, a gate transmission element may include a piston or other mechanical component having a gate surface that receives gate pressure over a gate area (the effective area of the gate surface). In some examples. the resultant force on the gate transmission element (such as a piston) may act to close a fluidic valve. In some examples, the resultant force of the gate transmission element may act to open a fluidic valve.

In some examples, a fluidic valve may be normally open, in which example a gate force may be needed to close the fluidic valve. In some examples, a fluidic valve may be normally closed, in which example a gate force may be needed to open the fluidic valve. A gate force may be a resultant gate force, resulting from for example one or more pressures acting on areas of a gate transmission element.

As illustrated in FIG. 1A, gate 20 of fluidic valve 10 may include one or more gate terminals, such as an input gate terminal 26A and an output gate terminal 26B (collectively referred to herein as "gate terminals 26") on opposing sides of gate transmission element 22. Gate terminals 26 may be elements for applying a force (e.g., pressure) to gate transmission element 22. By way of example, gate terminals 26 may each be or include a fluid chamber adjacent to gate transmission element 22. Alternatively or additionally, one or more of gate terminals 26 may include a solid component, such as a lever, screw, or piston, that is configured to apply a force to gate transmission element 22.

In some examples, a gate port 28 may be in fluid communication with input gate terminal 26A for applying a positive or negative fluid pressure within the input gate terminal 26A. A control fluid source (e.g., a pressurized fluid source, a fluid pump, etc.) may be in fluid communication with gate port 28 to selectively pressurize and/or depressurize input gate terminal 26A. In additional embodiments, a force or pressure may be applied at the input gate terminal 26A in other ways, such as with a piezoelectric element, flexoelectric element, an electromechanical actuator, or the like.

In the embodiment illustrated in FIG. 1A, pressurization of the input gate terminal 26A may cause the gate transmission element 22 to be displaced toward restriction region 24, resulting in a corresponding pressurization of output gate terminal 26B. Pressurization of output gate terminal 26B may, in turn, cause restriction region 24 to partially or fully restrict to reduce or stop fluid flow through the fluid channel 16. Depressurization of input gate terminal 26A may cause gate transmission element 22 to be displaced away from restriction region 24, resulting in a corresponding depressurization of the output gate terminal 26B. Depressurization of output gate terminal 26B may, in turn, cause restriction region 24 to partially or fully expand to allow or increase fluid flow through fluid channel 16. Thus, gate 20 of fluidic valve 10 may be used to control fluid flow from inlet port 12 to outlet port 14 of fluid channel 16.

FIG. 1B shows a schematic diagram of a fluidic circuit including a fluidic valve, such as the fluidic valve illustrated in FIG. 1A. The fluidic circuit 30 may include a circuit source pressure $P_{SS}$ 32, flow controller 34, fluidic valve 36 having a source 38, gate 40, and drain 42. The source may be connected to the flow controller 34. Drain 42 may be connected to the fluidic ground 46, represented by an inverted triangle. Fluidic ground 46 may be at a lower pressure, and may be at ambient pressure and may be a negative pressure. The input pressure $P_{in}$ may be received at inlet 44 and may be connected to gate 40. In relation to the example fluidic valve described in FIG. 1A, the source 38 may correspond to the inlet port 12 of the fluidic valve, into which fluid flows. Drain 42 may correspond to the outlet port 14 of the fluidic valve. The gate 40 may correspond to a port connected to gate 20 of the fluidic valve of FIG. 1A. In the schematic diagram of FIG. 2A, the solid lines represent fluid channels, through which fluid may flow. A fluid channel may be provided by a tube, conduit, pipe, or other channel through which fluid may flow or through which fluid pressure may be conveyed. In FIG. 1B, the fluid pressure tends to decrease going downwards through the figure (as illustrated). As typically illustrated, in fluidic schematic diagrams, fluid flows from the circuit source pressure (typically drawn at or near the top of the schematic) to the fluidic ground (typically drawn at or near the bottom of the schematic). The rate of fluid flow through the fluidic valve 36 may be controlled by an input pressure applied to the gate 40 of the fluidic valve. The flow controller 34 may include a restriction, such as an orifice having a reduced cross-sectional area compared with the fluid channels. In some examples, a flow restriction may be illustrated by a zig-zag line. In some examples, fluidic ground may also be referred to as the circuit drain, as fluid flows out of the circuit through the circuit drain to the fluidic ground. In some examples, a pump may recirculate fluid from the circuit drain at a relatively low pressure to circuit source at a relatively high pressure.

In the schematic of FIG. 1B, the symbol used to represent a fluidic valve has an exterior circle. This circle is optional, and in the schematic representations below the fluidic valve symbols do not have a surrounding circle to aid illustrative clarity.

FIG. 2A depicts a fluidic circuit, in this example a fluidic amplifier including a plurality of amplifier stages. Each amplifier stage is based on a pair of fluidic valves. FIG. 2A is a fluidic schematic of a fluidic circuit. The "+" symbol 122 represents a circuit fluidic source (e.g., a source of pressurized fluid for the fluidic circuit) and the inverted triangle 124 represents a circuit fluidic drain (e.g., an unpressurized or reduced pressure reservoir), which may also be referred to as a fluidic ground. These depictions are used in other fluidic schematic examples. Generally, pressure tends to be higher towards the top of the diagrams.

In FIG. 2A, fluidic valves, such as fluidic valve 116, may include three terminal devices in which the flow rate between the source and drain (top and bottom connections respectively) can be controlled by a gate input. Flow through a fluidic valve is from the source to the drain (which are from top to bottom as illustrated), and can be controlled by a gate input. In FIG. 2A, gate connections are depicted on the left, between the source and drain connections.

In FIG. 2A, a fluidic input is provided through fluidic input switch 112 and passes through fluidic resistor 114. In some examples, the fluidic resistor 114 may be a part of the valve 112 (e.g., as an inherent internal fluidic resistance), or may be a separate component. A fluidic input may include a time-dependent pressure and/or current provided by any source. In some examples, an input may be a mechanical input, for example acting on a component of one or more fluidic valves, such as a gate transmission element. In some examples, a fluidic input may include a mechanical displacement acting on a gate transmission element of a fluidic valve and/or a fluidic output may include a mechanical displacement that may be, for example, induced by a fluid pressure. A fluidic resistor, such as fluidic resistor 114, may include a flow restriction, such as an orifice. The first fluidic amplifier stage may include a pair of fluidic valves, fluidic valve 116 and fluidic valve 118. In some examples, fluidic valve 116 is a normally open fluidic valve, and fluidic valve 118 is a normally closed fluidic valve. Also, in some examples, a complementary valve may be used in place of a pair of discrete fluidic valves, such as fluidic valves 116 and 118. The fluidic input may be received by each gate of the pair of fluidic valves. The first fluidic amplifier stage may have an output 138, that is the input to a second fluidic amplifier stage including fluidic valves 126 and 128. Similarly, the second fluidic amplifier stage may have an output that is the input to a third (or output) fluidic amplifier stage that includes fluidic valves 130 and 132.

The fluidic amplifier of FIG. 2A may be referred to as a three-stage fluidic amplifier. The first fluidic amplifier stage (the "first stage") may be an input stage that receives a fluidic input. The second fluidic amplifier stage (the "second stage") may be termed an intermediate fluidic amplifier stage, as it is located between the first stage and the output fluidic amplifier stage (or "output stage"). In some examples, a fluidic amplifier may have no intermediate amplifier stage (e.g., a fluidic amplifier may have only an input stage and an output stage). In some examples, a fluidic amplifier may have an input stage, one or more intermediate fluidic amplifier stages (intermediate stages), and an output stage.

In some examples, an output stage may include a fluidic buffer amplifier. In some examples, a fluidic buffer amplifier may have approximately unity pressure gain but appreciable flow gain. A fluidic buffer amplifier may be used to separate the conditions on the input side from the output side, so changing the output does not change the input. A fluidic buffer amplifier may amplify the flow rate, but does not necessarily do so, depending on the output load and conditions. A buffer amplifier may be configured so that changes in the output pressure do no appreciably affect the input pressure, in the absence of fluidic feedback.

Pressure gain may be determined as the ratio of an output pressure to an input pressure, and may be a characteristic of the amplifier as a whole, an amplifier stage, or an individual fluidic valve. Similarly, flow gain may be a ratio of an input flow to an output flow. Input and/or output flows may be oscillatory, and an alternating direction flow may be characterized, for example, as a root mean square flow by analogy to alternating currents. For example, a flow gain may be expressed in terms of root mean square flows. In some examples, fluid channel dimensions may be greater for later amplifier stages, and an example output stage may have the largest dimensions for fluid channels and/or fluidic valves. For example, fluid channel and/or fluidic valve dimensions may increase from the input stage, to an intermediate stage, to an output stage.

FIG. 2B depicts an example fluidic amplifier including fluidic amplifier stages, where each fluidic stage is based on only a single fluidic valve. Each amplifier stage may include a fluidic valve and a fluidic resistor and may be compared to an electronic circuit having resistor-transistor logic. In each amplifier stage, a fluidic input (either the device input or the output of the previous amplifier stage) is received at the gate of a fluidic valve. The source of the fluidic valve may receive a source pressure, denoted by a "+" symbol, for example as shown at 162. The drain of the fluidic valve may be connected through a fluidic resistor (such as 164) to drain pressure (or fluidic ground), denoted by an inverted triangle, for example at 166. The device fluidic input is received through fluidic resistor 154. In some examples, flow resistor 114 may be an inherent aspects as the fluidic valve 112. In this example, variations in input pressure may be achieved by adjusting a switch at 152. However, the device input may be any source of varying fluidic pressure and/or flow.

In the example fluidic circuit of FIG. 2B, the fluidic input to the device passes through fluidic resistor 154 to a fluidic valve 156. The output of the first amplifier stage, including fluidic valve 156, may be provided to the gate of a second fluidic valve 158, which is configured in a similar manner. The output of the second amplifier stage based on fluidic valve 158 may be provided to the gate of a third fluidic valve based on fluidic valve 160. The third amplifier stage may provide the device fluidic output to fluidic load 168.

FIG. 3 depicts a fluidic circuit according to some embodiments. The fluidic circuit 200 is configured as a differential amplifier. First and second inputs are received at fluidic switches 202 and 204 respectively, which then provide first and second fluidic inputs. The fluidic inputs may be generated by any desired approach. For example, an electronic input may be used to provide a fluidic input, for example using electronic control of a fluidic switch or pump, and in some examples an electrical signal may be used to generated pressure using a transducer or actuator. In some examples, a mechanical input may act directly on a fluidic valve component, for example on the gate transmission element. For example, an electric signal to displacement transducer may be used to displace a gate transmission element. The fluidic inputs are shown as being provided by fluidic switches, but a fluidic input may include any combination of pressure and/or flow rate, for example a fluidic input may include a time-dependent pressure and/or flow rate. The fluidic circuit configuration may be compared to an electrical differential amplifier using dual pFET logic, for example using pairs of normally-open fluidic valves. The first fluidic input received at 202 is passed through fluidic resistor 206 to the gates two fluidic valves (fluidic valves 226 and 227), through fluid channel 210. Similarly, the second fluidic input received at fluidic switch 204 passes through fluidic resistor 208 to the gates of two other fluidic valves through fluid channel 212. In the circuit configuration as shown, a first intermediate output is provided through fluid channel 214 by a first pair of fluidic valves (including fluidic valve 227), each fluidic valve of the first pair receiving one of the first and second fluidic inputs. Similarly, a second intermediate output is provided at fluid channel 216 by a second pair of fluidic valves (including fluidic valve 226), each fluidic valve of the second pair also receiving one of the first and second fluidic inputs. For example, fluidic valve 226 is one of the second pair of fluidic valves and may receive the first fluidic input, and the second intermediate output is provided between the source of fluidic valve 226 and the drain of the other fluidic valve of the second pair of fluidic valves. The first and second intermediate fluidic outputs may provide the inputs to a second amplifier stage, including for example fluidic valves 228 and 229. The second amplifier stage may have a similar configuration to the input amplifier stage. The second amplifier stage in turn may provide first and second inputs (through fluid channels 218 and 220 respectively) to the output amplifier stage formed by a pair of fluidic valves, including output fluidic valves 230 and 231. The fluidic circuit may provide a fluidic output through fluid channel 222 between the source of output fluidic valve 230 and the drain of the output fluidic valve 231. The output may be provided to fluidic load 224, which may include, for example, an actuator such as a haptic device, or the like. In an alternative configuration, the output stage may have a configuration of the output fluidic valves (230 and 231) that is analogous to that of the input stage, so that the output stage may provide two outputs (one of which is high and the other of which is low).

Figure 4A:
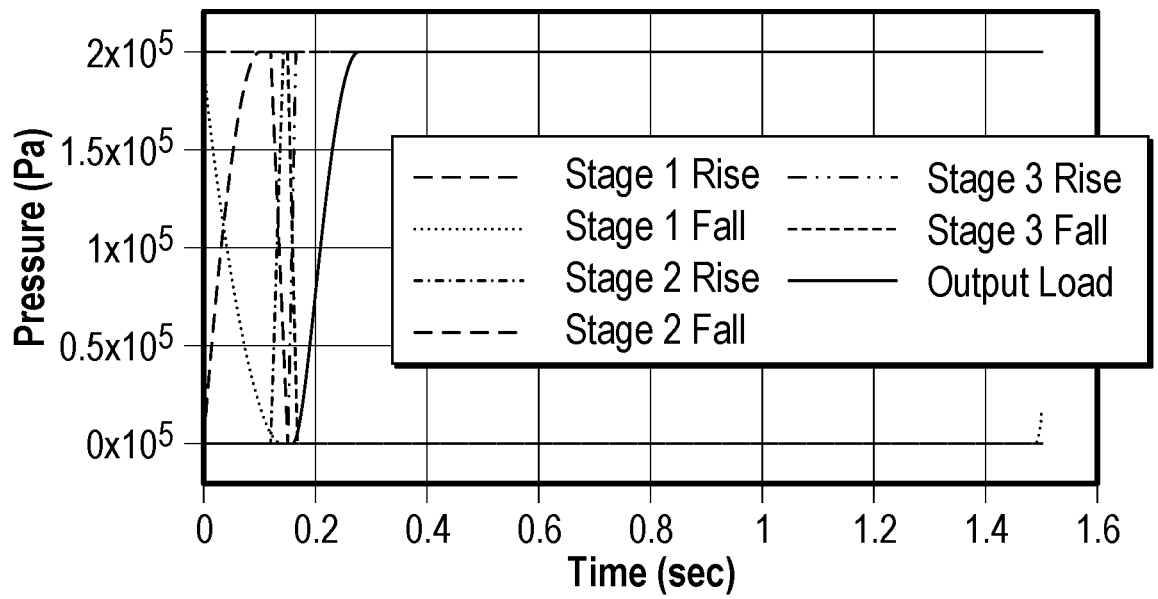
FIGS. 4A-4B depict response times of fluidic signals within a fluidic amplifier having multiple amplifier stages, according to some embodiments.

FIG. 4A depicts simulated response times of fluidic signals within a fluidic amplifier having multiple amplifier stages, according to some embodiments. The simulation refers to a fluidic circuit such as shown in FIG. 3. The simulation neglects parasitic effects such as the effects of finite tubing volume. The response times may be relatively fast. Here, Stage 1 refers to, for example, fluid channel 210, stage 2 refers to, for example, fluid channel 214, stage 3 refers to, for example, fluid channel 218, and output load refers to, for example, output fluid channel 222, as shown in FIG. 3. The response times are sub-second, which may be desirable.

Figure 4B:
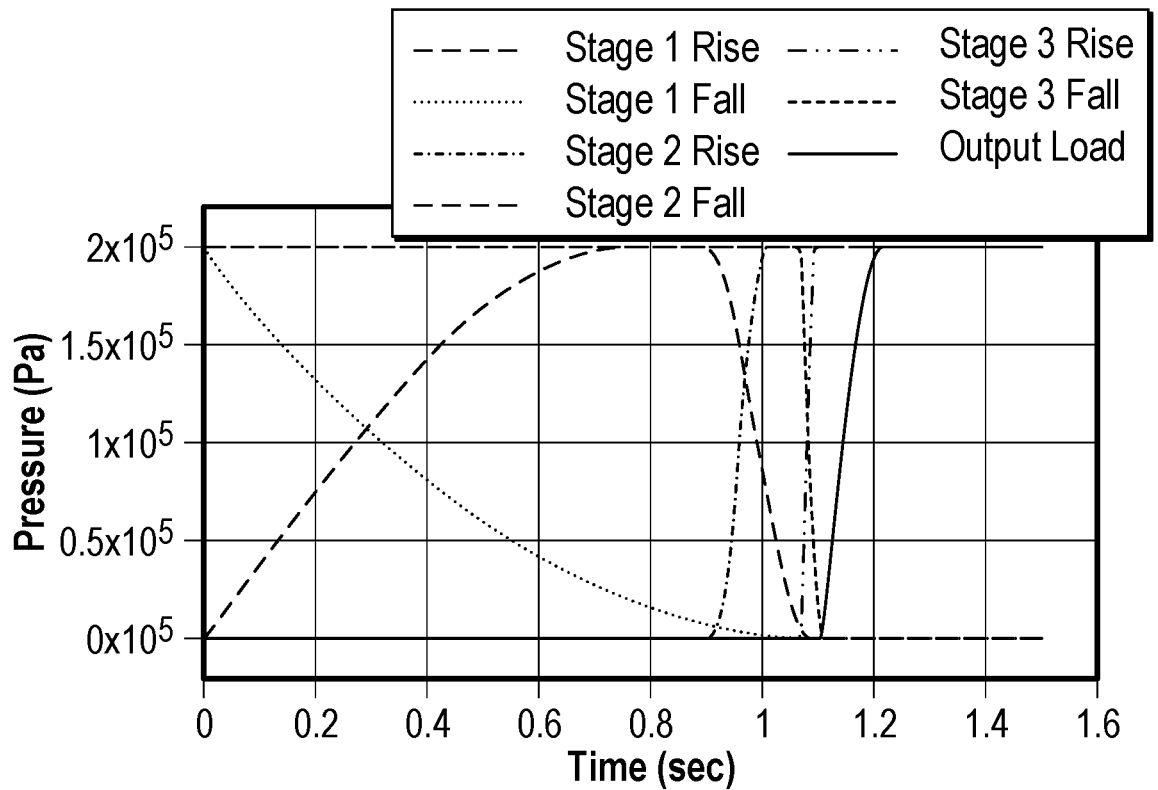

FIG. 4B depicts an expanded time-axis view of the response times of fluidic signals within a fluidic amplifier having multiple amplifier stages, according to some embodiments. This data is the same as FIG. 4A.

FIG. 5 depicts actual response times of fluidic signals within a fluidic amplifier having multiple amplifier stages, according to some embodiments. The simulation is of an actual device fabricated from individual fluidic valves connected together using tubing, according to the schematic of FIG. 3. The effects of tubing may be slightly detrimental and may lead to an output load response that is delayed by over one second. The actual response time data is in very good agreement with the simulated data shown in FIGS. 4A and 4B. As discussed above, the output response may be delayed by over one second by tubing parasitics. However, the fluidic circuit may provide great advantages over direct drive circuits, as discussed further below.

FIG. 6 shows for comparison the response time using the same fluidic load as used at the output of the fluidic circuit, using a fluidic pump having the same input capacitance and load (e.g., input resistance) as used for the input of the fluidic amplifier circuit. FIG. 6 shows a relatively slow response, corresponding to connecting a small capacity source directly to a large capacity load, without using a fluidic circuit. The response time of the fluidic circuit of FIG. 5 is over 15 times faster than that of the direct drive response of FIG. 6. This direct drive circuit has a direct connection between the input and the output load. The response time is relatively long due to the limited flow available from the fluidic pump. In comparison, a fluidic amplifier may provide significant flow amplification and enable a greatly reduced response times. The increased flow rates available from the output stage of a fluidic amplifier allows a large fluidic load to be driven relatively quickly, compared to the direct drive approach.

FIG. 7 depicts simulated response times of fluidic signals within a simulated fluidic amplifier having multiple amplifier stages, according to some embodiments. In this case, fluidic stages have millisecond response times and an output response time of less than a second is obtained. Two approaches were found helpful in order to improve these simulated results. In one approach, tubing parasitics were eliminated. For example, fluidic devices may be integrated with each other with greatly reduced fluid channel length between devices. The response time was found to reduce by a factor of about 5 by removing long discrete tubing between fluidic valves. Another improvement was obtained by reducing the area ratio of the fluidic valves. The constructed fluidic circuit used fluidic valves with a gate area ratio of 29 (for an output response of over 1 second). Reducing the area ratio to 2 approximately halved the response time in simulations. Reducing the area ratio increases the switching threshold pressure, and this appeared to improve the response time. The measured gain of constructed fluidic valves was approximately equal to the gate area ratio for fluidic valve opening, and slightly less for fluidic valve closing. In this context, the switching threshold pressure may be a gate pressure sufficient to appreciably displace the gate transmission element. The switching threshold pressure may depend on one or more parameters, such as device configuration, source pressure, the resistance provided by any resilient components, interstitial pressure (if any), and the like. In some examples, the switching threshold pressure may be defined as the gate pressure required to fully open or close a fluidic valve, or to achieve a certain degree of displacement of the gate transmission element of the fluidic valve.

Figure 8:
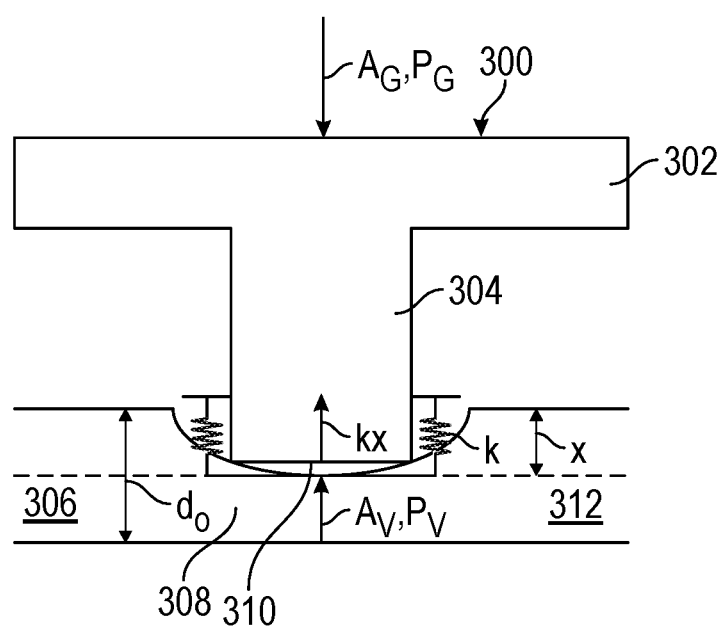
FIG. 8 depicts an example fluidic valve, which may be used in some embodiments.

FIG. 8 depicts a simplified schematic of a fluidic valve that may be used in some embodiments. The fluidic valve includes a gate transmission element, in this case a piston 302 having a gate surface 300 that receives gate pressure $P_G$ over gate area $A_G$. The resultant force on the piston, acting downwards as indicated by the arrow, is approximately the product $P_G A_G$. In the example of fluid flow from left to right through channel 308, the fluidic valve has a source 306 and drain 312 connected by channel 308. As illustrated, the lower end of the piston may form a valve closure element 310 that closes the channel when the piston is fully depressed. There is an opening force on the valve approximately equal to the product of the channel fluid pressure $P_V$ and the effective area of the end of the valve $A_V$. As the gate area $A_G$ is greater than the valve area $A_V$, a relatively smaller pressure $P_G$ can control a larger pressure $P_V$. $P_V$ may be assumed to be approximately the mean of the source and drain pressure. The pressure gain of the fluidic valve is approximately equal to the relative area ratio $A_G/A_V$. The figure shows an additional elastic restoring force (kx) which in this example a function of piston displacement downwards (x in the closed direction) and restoring elastic constant (k). The elastic constant (k) may be modeled as a spring element, as illustrated by the zig-zag line. Elastic forces may depend on exact valve configurations and in some examples may be neglected. In some embodiments, the elastic restoring force is non-linear with displacement.

Figure 9A:
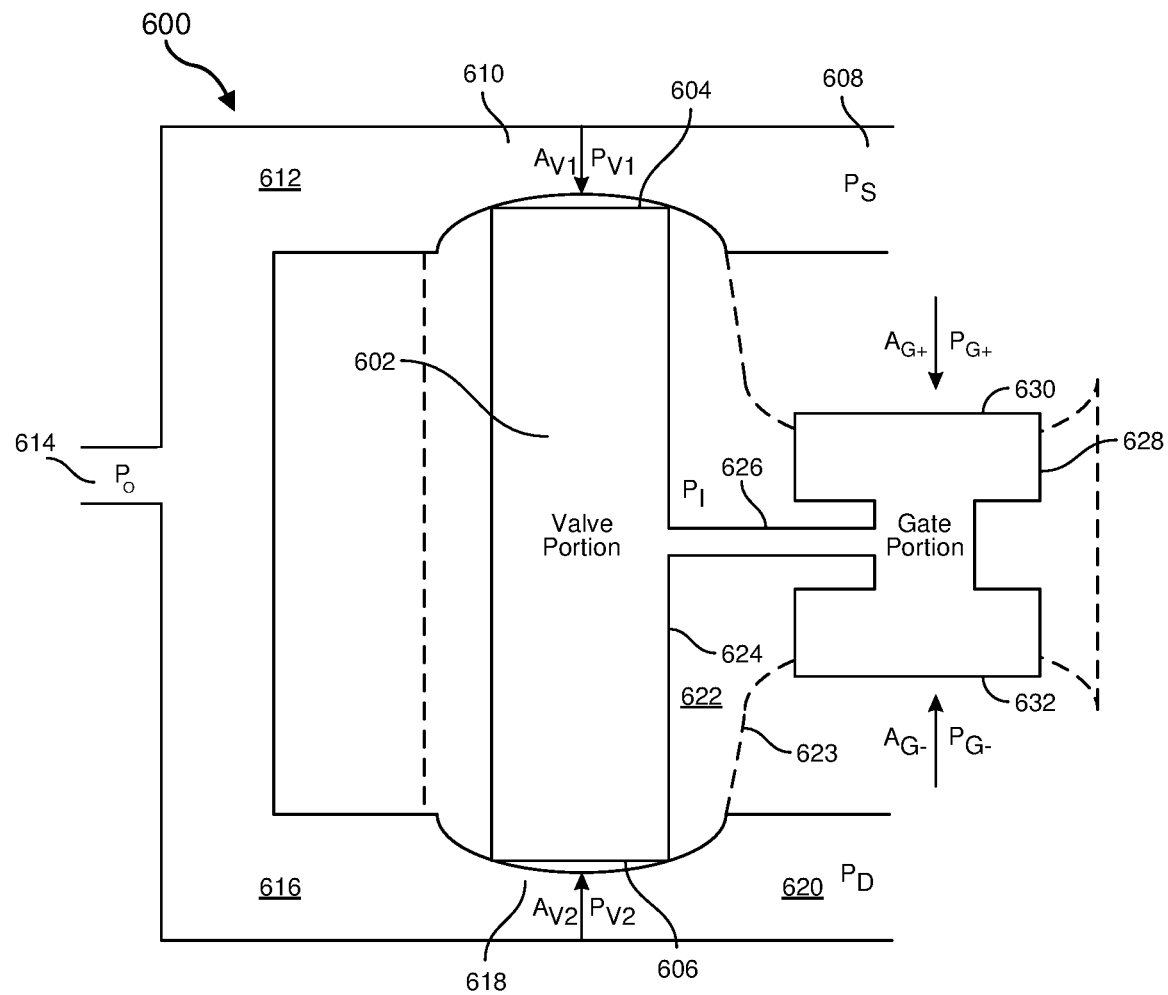
FIG. 9A depict example complementary fluidic valves, which may be used in some embodiments.

FIG. 9A shows another example fluidic valve that may be used in some examples. The fluidic valve 600 includes source 608 (at source pressure $P_S$), first valve channel 610 at first valve channel pressure $P_{V1}$ acting over area $A_{V1}$, intermediate channel with upper portion 612 and lower portion 616, second valve channel 618 at second valve channel pressure $P_{V2}$ acting over $A_{V2}$, and drain 620 (at drain pressure $P_D$). A valve element includes a gate portion with first surface 630 and second surface 632, a valve portion 602 with upper and lower valve portion surfaces 604 and 606, and a connecting portion 626. An enclosed interstitial region 622 may have an interstitial pressure $P_I$, which may be independently controlled. The dashed line 623 indicates the extent of the interstitial region, enclosing the interstitial pressure.

A device output can be obtained in the intermediate channel 612, for example by using an outlet 614 within intermediate channel wall. This output pressure is denoted Po and may be determined at least in part by a balance of forces on the gate portion. For example, as the first gate pressure $P_{G+}$ increases (and/or as the second gate pressure $P_{G-}$ falls), then the first valve channel may be expanded, the second valve channel may be constricted, and Po may tend to approach $P_S$. As the second gate pressure $P_{G+}$ increases (and/or as the first gate pressure $P_{G-}$ falls), then the first valve channel may be constricted, the second valve channel may be expanded, and Po may tend to approach $P_D$. In addition, there may be balanced configurations in which Po achieves intermediate values between $P_S$ and $P_D$, for example the mean value of $P_S$ and $P_D$. In the illustrated example, the first valve channel pressure $P_{V1}$ may act against the second gate pressure $P_{G-}$ and the second valve channel pressure $P_{V1}$ but may act with the first gate pressure $P_{G+}$. Similarly, the second valve channel pressure may act against the first gate pressure and first valve channel pressure but may act with the second gate channel pressure.

A fluidic valve represented by FIG. 9A may be termed a complementary fluidic valve. In this example, $P_S$ is greater than $P_D$. If the magnitude of pressures and the flow directions are reversed, then $P_{G+}$ and $P_{G-}$ may reverse. In this example, the positive (+) and negative (−) symbols are used to indicate the direction of the expected change to Po as that pressure is increased. In this example, these symbols are not used to indicate positive or negative pressure. Po may tend to increase as $P_{G+}$ is increased, and Po may tend to decrease as $P_{G-}$ is increased. Interior interstitial pressure may be controlled independently of the other pressures. The two gate pressure sources (for $P_{G+}$ and $P_{G-}$) may be substantially isolated from each other and also isolated from the interstitial pressure ($P_I$) and from the channels. Embodiments of this disclosure include any suitable modification to these example designs.

A complementary fluidic valve, such as illustrated in FIG. 9A, may be used in a fluidic circuit according to a representative embodiment. For example, a complementary fluidic valve may be used in one or more amplifier stages. A complementary valve may provide a way of interfacing between a restricted control input and a large load. For example, the pair of valves used as the input stage in the fluidic circuit of FIG. 2A may be replaced by a single complementary valve.

Figure 9B:
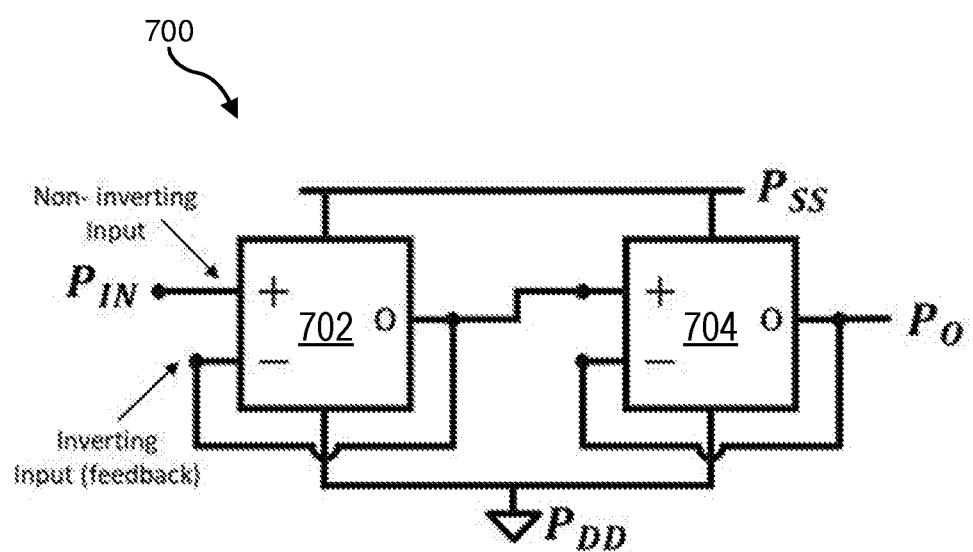
FIG. 9B illustrates a schematic of a fluidic amplifier, which may be used in some embodiments.

FIG. 9B represents an example fluidic circuit diagram schematic for a fluidic cFET analog exponential horn 700, including two stages (702 and 704). In the schematic diagram, the plus and minus symbols (+ and −, respectively) may correspond to $P_{G+}$ and $P_{G-}$ (e.g., 630 and 632 in FIG. 9A, respectively) and the output "O" may represent the output pressure Po. Also, $P_{SS}$ and $P_{DD}$ may represent the circuit source and drain pressures, respectively. For comparison, in a "digital" cFET exponential horn, P(−) may be tied to the source pressure.

In an example analog exponential horn, the gate pressure-receiving areas $A_{G+}$ and $A_{G-}$ may be substantially similar, for example having an area ratio of approximately unity.

In some examples, a fully non-inverting cFET exponential horn may be used for analog amplification and/or signal buffering. The cFET may be used with feedback, where the output of one stage is fed forward to the non-inverting input of the next stage, and backward to the inverting input of the same stage. The cFET may operate with negative feedback. The design may be achieved using a slightly modified analysis, considering the additional capacitance from the previous stage. Assuming the slowest case, where all the cFETs are unity gain (e.g., where both gates have an equal area), then an optimized (e.g., altered scaling factor s=1.67) analog exponential horn is only 3.4% faster than a non-optimized horn (where s=1.5). There appears to be little benefit from further optimization of the scaling factor. In some examples studied, a non-optimized analog exponential horn had a response time 30% slower than the non-optimized digital exponential horn. However, in exchange for the performance trade-off, enhanced linearity is obtained. In some examples, higher gains may allow reduced response times, as the inverting input may have a proportionally lower capacitance than the non-inverting input. Impedance-matching approaches that allow reduction of the total delay for a "digital" amplification also reduce the delay for a smaller pressure change (as there is a time constant associated with both sets of changes). Using unity-gain cFETs (e.g., where the inverting and non-inverting gate have the same area), this allows design of an optimized flow buffer for outputting very high current from low current inputs. Pressure gain may be implemented using cFETs with different gate areas in feedback. If a high current gain is desired for a fluidic circuit, an fluidic amplifier (such as an exponential horn) may be designed with the gain evenly divided between stages to achieve a faster response. The analog feedback configuration may be slightly slower than the forward-fed binary exponential horn (although only about 30% slower in the case of the unity gain buffer). A scaling factor (s=3/2) may be used between stages. This may be not the global optimum, but may be within a few percent, so as to not require any further circuit modification.

Figure 9C:
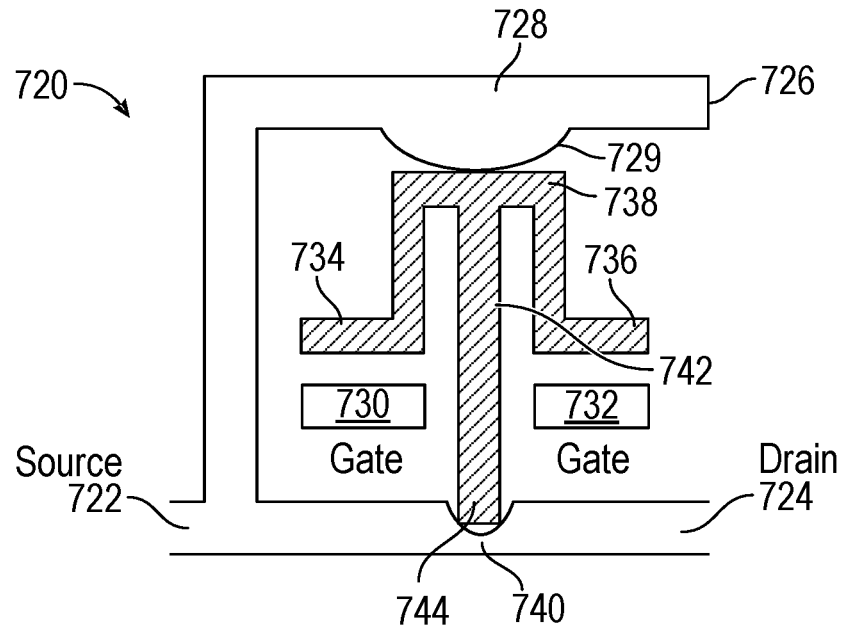
FIGS. 9C and 9D depict an example normally-closed fluidic valve, which may be used in some embodiments.
Figure 9D:
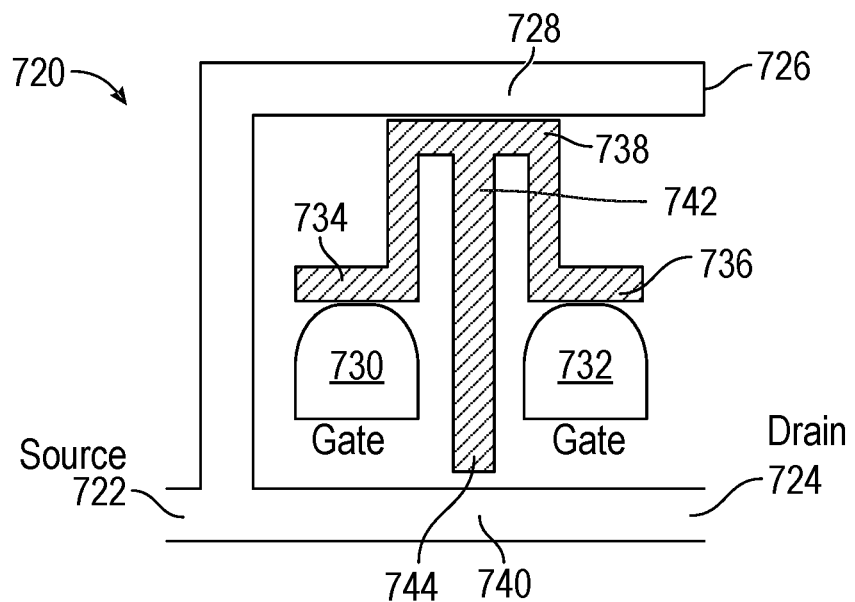

FIGS. 9C and 9D depict an example normally closed fluidic valve, which may be termed an nFET type fluidic valve, by analogy to the nFET electronic component. FIG. 9C shows the example fluidic device 720 as including a fluidic source 722 (which may also be termed an inlet port), a fluidic drain 724 (which may also be termed an outlet port), a flow channel 740, a fluidic gate that in this case includes a pair of gate pressure receiving inlets (730 and 732), a gate transmission element 742 (including a pair of gate pressure receiving portions 734 and 736, a top portion 738, and an end portion 744), and a source channel extension 726 including a channel portion 728 having a flexible wall element 729.

As shown in FIG. 9C, flow between the fluidic source 722 and the fluidic drain 724 through the channel 740 may be controlled by the position of the gate transmission element 742, for example by the position of the end portion 744 of the gate transmission element 742 relative to the flow channel 740. As shown, the end portion 744 restricts fluid flow through the flow channel 740 between the fluidic source 722 and the fluidic drain 724. The end portion may be urged downwards by the source pressure, to restrict the flow through the flow channel 740. The source pressure may be conveyed through the source channel extension 726 to the channel portion 728, which includes a flexible wall element 729 that allows the source pressure to act on the gate transmission element 742, to urge the gate transmission element 742 downwards to restrict (or stop) flow through the flow channel 740.

FIG. 9D shows the fluidic device 720 having the gate transmission element 742 urged upwards by the gate pressure. The gate pressure is received by the pair of gate pressure receiving inlets (730 and 732), which include flexible walls that allows the gate pressure to be conveyed to the respective pair of gate pressure receiving portions 734 and 736, and thereby to the end portion 744. As shown, the gate pressure acting on the gate pressure receiving portions of the gate transmission element overcomes the source pressure, and moves the gate transmission element upwards (as illustrated, relative to the position shown in FIG. 9C). This movement of the gate transmission element may also restore the flexible wall element of the channel portion 728, of the source channel extension 726, to an undeformed state.

The fluidic device 720 shown in FIGS. 9C and 9D may be configured as a normally-closed valve, for example if the configuration of FIG. 9C closes the flow channel 740. In other examples, there may be partial flow through the flow channel 740 even in the absence of any gate pressure. The device may have an area ratio between the gate pressure receiving areas (e.g., of the gate pressure receiving portions 734 and 736), and the source pressure receiving area (e.g., at least part of the upper surface of top portion 738 of the gate transmission element 742, acted on by the flexible wall element 729). In some examples, the area ratio may be adjusted to obtain desired device characteristics.

Example fluidic devices, such as those shown in FIGS. 9A-9D may be used in fluidic circuits according to some embodiments. In some examples, the source pressure and/or gate pressure may be conveyed using direct fluid contact with respective pressure-receiving portions of the gate transmission element.

Figure 10A:
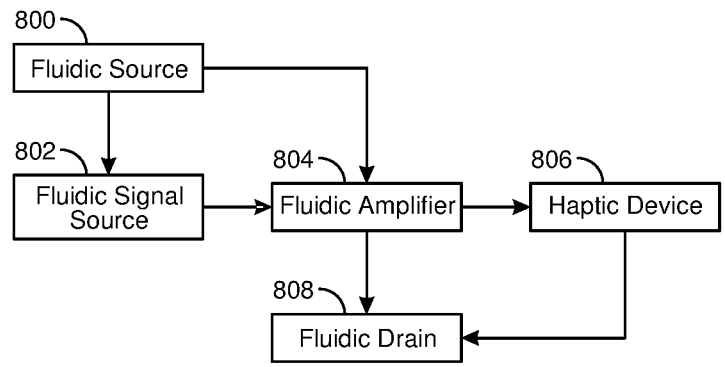
FIGS. 10A-10C depict fluidic systems in accordance with some embodiments.

FIG. 10A shows a block diagram of an example fluidic device, including a fluidic source 800 supplying fluidic pressure to a fluidic signal source 802 and a fluidic amplifier 804. The fluidic amplifier supplies a fluidic signal (which may be termed a fluidic output) to a haptic device 806. The fluidic amplifier and haptic device may be connected to a fluidic drain 808. In some examples, the haptic device may drain back through the fluidic amplifier, rather than being coupled to a separate fluid drain.

Figure 10B:
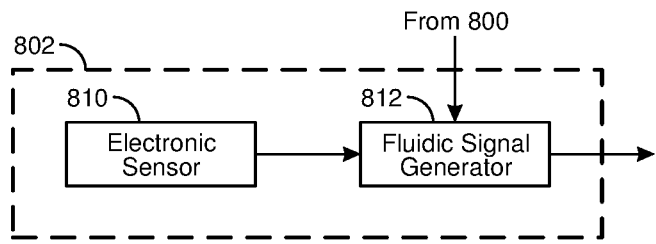

FIG. 10B shows an example configuration of a fluidic signal source 802 in which an electrical element 810, such as an electronic sensor, electrically modulates an output of a fluidic signal generator 812 (which may include, e.g., a pump). The output of the fluidic signal generator is provided to the fluidic input of a fluidic amplifier (e.g., fluidic amplifier 804 as shown in FIG. 10A).

Figure 10C:
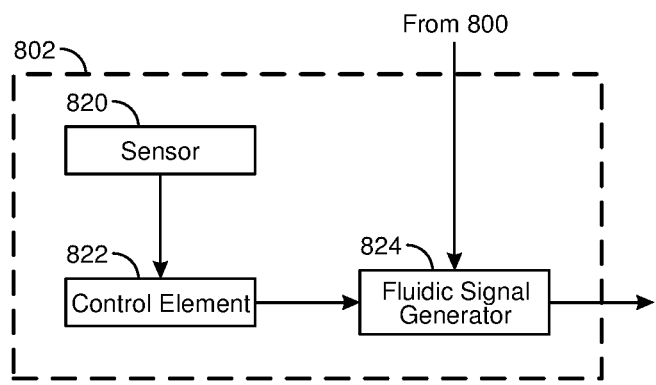

FIG. 10C shows another example configuration of a fluidic signal source 802 in which a sensor 820 provides data to a controller 822, which then electrically controls a fluidic signal generator 824 to provide a fluidic signal to a fluidic amplifier (e.g., fluidic amplifier 804 as shown in FIG. 10A). The controller 822 may receive sensor signals from a plurality of sensors.

Figure 11:
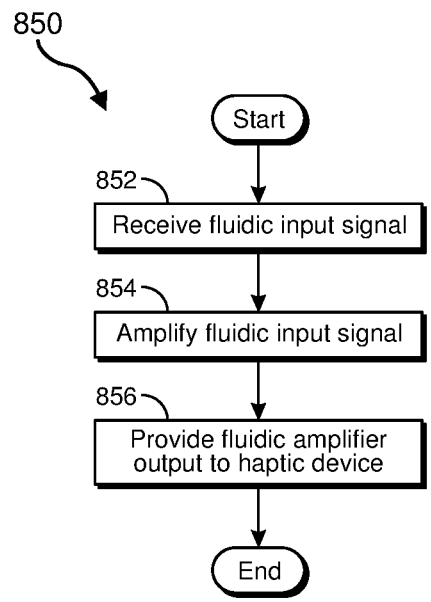
FIG. 11 depicts a method in accordance with some embodiments.

FIG. 11 shows a flow chart of an example method 850, including receiving, at a fluidic amplifier, a fluidic input signal (852), amplifying, by the fluidic amplifier, the fluidic input signal, for example, to provide a fluidic amplifier output signal (854), and providing the fluidic amplifier output to a haptic device (856).

Figure 12:
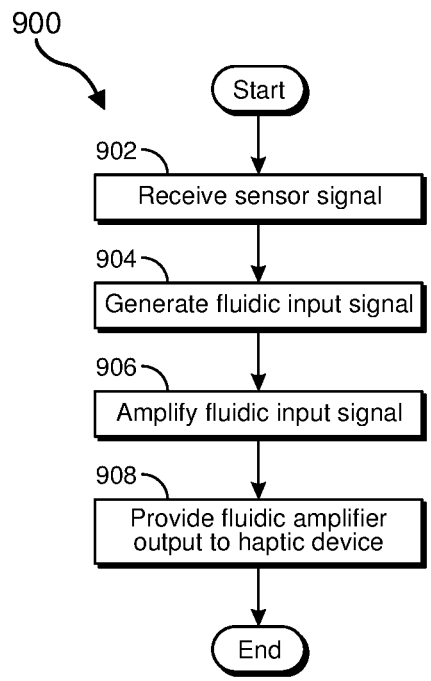
FIG. 12 depicts a method in accordance with some embodiments.

FIG. 12 shows a flow chart of an example method 900, including receiving a sensor signal, which may be an electrical sensor signal (902), generating a fluidic input signal (e.g., in response to the received sensor signal (904)), amplifying the fluidic input signal (e.g., by a fluidic amplifier (906)), and providing the fluidic amplifier output to a haptic device (908).

Figure 13:
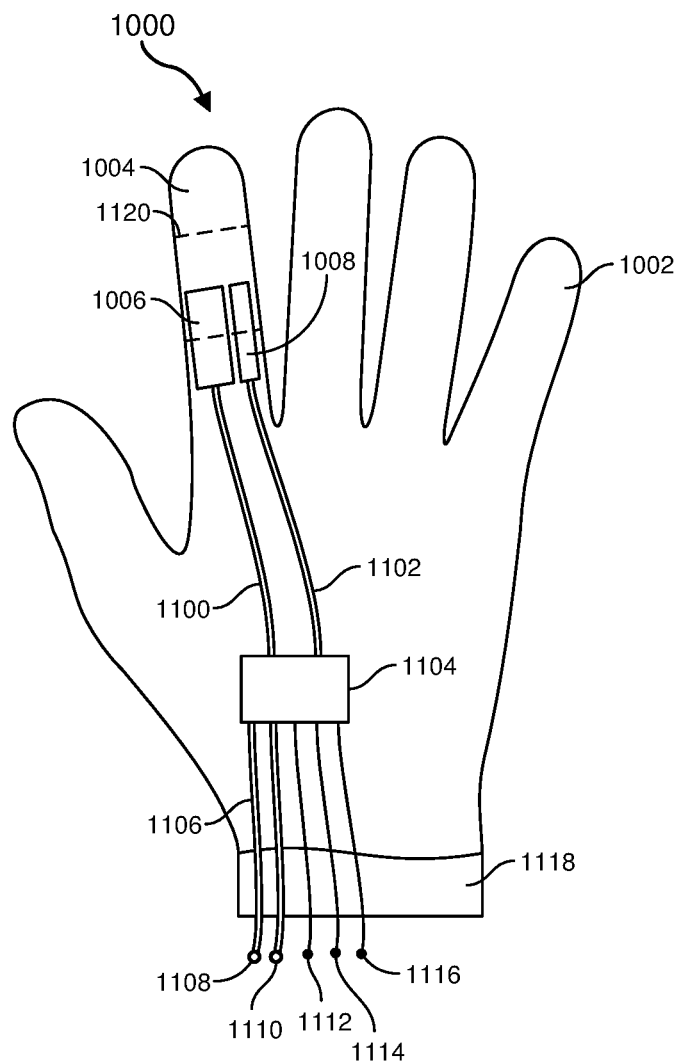
FIG. 13 depicts a haptic glove in accordance with some embodiments.

FIG. 13 shows an example haptic device. In this example a glove 1000, includes a haptic transducer 1006 and a sensor 1008 located on a finger 1004 of glove 1000, in this case near a finger joint (as represented by a dashed line such as 1120). The haptic device is fluidically connected via fluid channel 1100 to a controller 1104. The sensor is electrically connected via cable 1102 to the controller 1104. The controller may receive pressurized fluid at source pressure through source fluid channel 1106 having source connection 1108. Similarly, the controller may return fluid through a drain fluid channel having a drain connection 1110. The controller may also receive electrical power through power connections 1112 and 1116 and may send and receive electrical signals through signal connection 1114. The glove has a wrist cuff 1118 and additional fingers, such as little finger 1002.

FIG. 13 shows an arrangement that may be located on the front and/or back of a hand. Sensors and/or haptic devices may be located at one or more joints of one or more fingers (and in this context, the general term "finger" includes the thumb).

Figure 14:
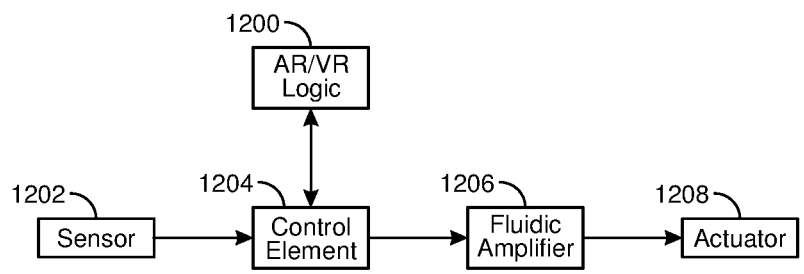
FIG. 14 is a schematic of a system in accordance with some embodiments.

FIG. 14 is a schematic of an example system including a sensor 1202 providing a sensor signal to a control element 1204. The control element may exchange data with an AR/VR logic unit 1200. The control unit may send fluidic signals to a fluidic amplifier 1206, which in turn provides an amplifier fluidic signal to an actuator 1208. The actuator may include a haptic device.

Fluidic circuits, such as analog fluidic circuits, may be used in devices such as a variable-stiffness jammer, user force-dependent grounding, and fine control of soft robots, actuators, and the like. Example devices include fluidic amplifiers having an improved or controlled frequency responses, feedback controls, devices providing a conversion of displacement to pressure, or pressure to fluid flow conversion, microfluidic devices, fluidic valves, or other approach.

Example fluidic circuits may convert small changes in input pressure and/or input flow into proportional (or semi-proportional) changes in output pressure and/or flow. Fluidic amplification may include fluidic gain in pressure and/or flow, allowing increased output pressure and/or current changes as a result of input pressure and/or current changes. In some examples, the output of a fluidic device may be connected to a haptic device. In some examples, an actuator may affect an all-or-nothing change to a fluidic signal, which may be termed a binary or digital actuator. Semi-continuous signals may be generated by multiple binary actuators working in parallel, but this may involve using a corresponding number of independent controls. Continuous pressure may also be generated through an independent pressure controller; however, in some embodiments these may be bulky and not easily miniaturized. The use of analog fluidic amplifiers may reduce or substantially eliminate such problems. For example, an analog fluidic signal (such as a dynamically variable flow and/or pressure) may be provided by a fluidic amplifier, which in some cases may include only a single fluidic valve.

In some examples, a fluidic circuit may include one or more unity-gain complementary fluidic valves (e.g., which may be termed cFETs, and in which the inverting and non-inverting gates have the same area). The fluidic circuit may be configured to obtain an optimized flow buffer for outputting relatively high flow outputs based on relatively low flow inputs. In some examples, pressure gain can be obtained using complementary fluidic devices (sometimes referred to herein as cFETs) having different gate areas, optionally with feedback. For example, if a high current gain is desired, a fluidic circuit having the gain evenly divided between amplifier stages may have the fastest circuit response. In some examples, an analog feedback configuration may be slightly slower than a forward-fed binary exponential horn (though this may be only about 30% slower in what may be the worst case of the unity gain buffer). In some examples, using a scaling factor of 3/2 between stages may not be the global optimum, but may be close enough (e.g., to within a few percent) to not require any modifications to the scaling used.

In some examples, a fluidic amplifier may be configured to increase the pressure and/or flow from a fluidic input to an output load. A fluidic amplifier may be configured to increase the flow rate to an output, compared with that which would be obtained without the amplifier, and, in some examples, to decreases the time taken to drive the load from a given input.

In some examples, fluidic devices may take an input signal including one or more (or a combination of) pressure, flow rate, or mechanical displacement, and generate an output signal of pressure, flow rate, and/or mechanical displacement that is substantially proportional to the input signal. In some examples, this may be achieved using partial actuation of one or more relative area valves, and optionally may be combined with an implementation of pressure-based feedback.

In some examples, a fluidic valve may include a relative area valve with a pressurized gate transmission element region (e.g., a piston region). This configuration may add one more terminal to a relative area valve allowing for pressurization of the region between the gate and valve seat. Control of this pressure may allow for control of actuation pressure of normally-closed valves and may enable normally-closed valves to function in a similar manner to normally-open valves.

In some examples, a fluidic circuit includes a relative area fluidic valve with a interstitial region (e.g., piston region) that is pressurized. This configuration may add one more terminal to a relative area valve and may allow for pressurization of the interstitial region between gate and the valve seat. Control of this pressure may enable control of the actuation pressure of normally-closed valves and may also enable use of normally-closed valves as normally-open valves. In some examples, a relative area fluidic valve may include an innate fluidic feedback and/or may include a high impedance to increase the pressure and/or flow amplification.

In some examples, a device may include a complementary relative area valve circuit, which may include feedback. Feedback may be configured as inverting or non-inverting. In some examples, chained complementary valves may be configured in inverting or non-inverting configurations. In some examples with an inverting chain of fluidic valve stages, the stage outputs may alternate between high and low at the output of each stage. In a non-inverting chain fluidic valves, the output may be the same (high or low) at the output of each stage. In some examples, a complementary relative area valve may be configured as differential amplifier. Additionally or alternatively, a complementary relative area valve may be configured as current mirror. In some examples, a complementary relative area valve may be configured as a positive feedback device and may be used as a pseudo-latch. Furthermore, a complementary relative area valve may be configured as a positive feedback device and may be used as a pseudo-latch.

Example fluidic circuits may include a differential pair with input controls where one output flow (and/or output pressure) increases as the other output flow (and/or output pressure) decreases. In some examples, a device, such as a fluidic amplifier, may include a pair of fluidic valves configured as a fluidic differential amplifier. A fluidic differential amplifier may be configured with or without output flow buffering.

In some examples, a fluidic circuit, such as an analog fluidic amplifier, may include a single-valve fluidic amplifier including only a single fluidic valve. Example fluidic amplifiers may have different amplifier topologies, such as common gain amplifiers or common gate amplifiers.

A fluidic valve may be termed a fluidistor (based on the term "fluidic transistor"), for example if it provides fluidic pressure gain and/or flow gain.

In some examples, a buffer amplifier may be used, for example, for signal isolation. In some examples, a fluidic circuit may include a current mirror in which a fluidic flow rate is reproduced in one or more additional fluid channels.

In some examples, a device, such as a fluidic amplifier, may include a plurality of fluidic valves. A fluidic amplifier may include a differential amplifier. A fluidic amplifier may be configured with or without output flow buffering.

In some examples, a device may include a fluidic oscillator, optionally with a frequency control. Oscillation can be induced in a fluidic circuit using positive fluidic feedback, for example where a rising input pressure gives a rising output pressure, and part of the output pressure is fed back to the input. The frequency control may include an adjustable output flow restrictor. An adjustable flow restrictor may include an adjustable aperture (such as an adjustable area aperture or an aperture selectable from a plurality of apertures having different aperture areas).

In some examples, a flow restrictor (which may also be referred to as a flow resistor) or a high-impedance constant current source, may include an orifice, and may be placed upstream of a fluidic valve. A flow restrictor upstream of a fluidic circuit may provide a high-impedance pressure input to increase the pressure-to-pressure signal gain (e.g., of a fluidic amplifier including the fluidic valve). In some examples, a flow restrictor may be located downstream of a fluidic valve (e.g., between the drain of the fluidic valve and the drain rail pressure). This may increase the linearity of the input pressure/output flow rate relationship and may provide a method of creating linearly proportional fluidic resistance in the compressible region. In some examples, a single flow restrictor may be placed between a location with variable pressure and a low-pressure location. Provided that the absolute pressure of the low-pressure location is lower than approximately half the absolute pressure of the upstream point, the flow restrictor may be driven into a choking regime, where the flow becomes linearly dependent on the upstream pressure. Thus, a single flow restrictor can turn non-linear compressible fluid flow into linear flow/pressure relationship and provide an effectively linear flow resistor. In some examples, two or more orifices may be used in series to provide a steady inter-device pressure between a first fluidic valve and a second fluidic valve (e.g., a pressure that is independent of a downstream pressure at the second fluidic valve and dependent only on the upstream pressure). One or more orifices may be provided in a method of creating a high-stability pressure source. In some examples, a flow resistor may be an inherent an innate aspect of a fluidic valve. The flow resistance of a fluidic valve may act as an undesirable parasitic resistance, and may be overcome by a fluidic amplifier such as an exponential horn.

A fluidic valve may also be termed a "fluidistor" based on the term "fluidic transistor," but a fluidic valve may function differently than an electrical transistor counterpart. Many functions described herein may be achieved with different circuit topologies or a different design of the fluidic valves. Fluidic valves include, for example, normally open, normally closed, and complementary relative area fluidic valves. Examples described herein may use compressible fluids or incompressible fluids. In some examples, a fluid may be a liquid. In some examples, a fluid used in a fluidic device may be (or include) an aqueous fluid (such as water, a salt solution, and the like). In some examples, a fluid used in a fluidic device may be (or include) an oil, such as a hydrocarbon. In some examples, a gas (such as air or nitrogen) may be used instead of a liquid fluid used in a fluidic device and the like. In some examples, a fluid may be a multiple phase and/or non-Newtonian fluid, such as a liquid crystal, thixotropic liquid, emulsion, micellar solution, and the like.

Fluidic circuits may be constructed using discrete components, such as individual fluidic valves interconnected using fluid channels, such as tubing. As discussed herein, tubing parasitics may slow the response of a fluidic circuit, and response times can be improved, for example by shortening tubing where possible, or by integrating multiple fluidic devices into a fluidic integrated circuit. An adapter board may be used for connecting pressure sensors to a fluidic circuit. For electronic sensors or other electrical circuits, a mains frequency filter (e.g., a 60 Hz filter) may be used to remove electrical noise. In prototyping devices, a housing may connect pressure sensors and/or flow sensors to an amplifier board with a variety of mechanical attachment ports. Sealed connections to the sensors may be made without over-compressing the sensors and the connections may be adapted to reduce dead volume and/or the ability to direct flow into different directions. A fluidic circuit prototype may include a controllable pressure source, a flow sensor, and a pressure sensor in series, and an attachment for connecting a fluidic valve or other component to be evaluated. An optical imaging device, such as a high-speed camera, may be used to correlate fluidic variables with mechanical displacement of a membrane.

In some examples, a fluidic valve may be constructed using glass, ceramic, metal, polymer, insulator, or other material components. Fluid channels and movable components may be formed by etching system components, such as valve components or seals. In some examples, a fluidic valve may be assembled from individual components. In some examples, a fluidic valve may have a multilayer structure.

An exemplary computer-implemented method for providing a haptic signal may include receiving, by a fluidic amplifier, a fluidic input. The fluidic input may be compared to a reference fluidic signal, such as a bias pressure, and a difference fluidic signal may be generated. The difference fluidic signal may be based on the difference between a fluidic input pressure and a fluidic bias pressure. The amplified fluidic signal may then be provided to further fluidic amplifier stages, such as a fluidic buffer amplifier. The fluidic amplifier may provide appreciable flow amplification of the fluidic amplifier signal.

One or more method steps may be performed by any suitable computer-executable code and/or computing system. In some examples, one or more method steps may represent an algorithm whose structure includes and/or is represented by multiple sub-steps. In some examples, methods include receiving an input signal including a one or more of pressure, flow rate, or mechanical displacement, and generating an output signal including one or more of a pressure, flow rate, or mechanical displacement that is substantially proportional to the input signal. In some examples, this may be achieved using partial actuation of one or more relative area valves, and optionally may be combined with providing pressure-based feedback.

In some examples, a method includes receiving a fluidic input signal, and providing, using a fluidic amplifier, a fluidic output signal correlated with the fluidic input signal. The flow rate and/or pressure of the output signal may be amplified to provide a fluidic output signal. A fluidic output signal may be provided to one or more actuators, which may include one or more haptic devices. A fluidic circuit may include a pair of fluidic valves, and optionally may further include a fluidic flow mirror to balance flows to each of the pair of fluidic devices. In some examples, a method includes amplifying a pressure of a fluidic signal using a fluidic amplifier and then amplifying the flow rate of the fluidic signal using a fluidic buffer amplifier.

In some examples, a method includes receiving a fluidic input signal, receiving a reference fluidic input signal (e.g., a bias pressure), and providing, using a fluidic difference circuit, a fluidic difference signal correlated with a difference between the fluidic input signal and the reference fluidic input signal. The flow rate and/or pressure of the fluidic difference signal may be amplified to provide a fluidic output signal. A fluidic output signal may be provided to an actuator such as a haptic device. A fluidic circuit may include a pair of fluidic valves and optionally may further include a fluidic flow mirror to balance flows to each of the pair of fluidic devices.

In some examples, a computer-implemented method includes controlling a fluidic source to provide a fluidic input signal and then amplifying the fluidic input signal using a fluidic circuit to provide a haptic signal to a person. In some examples, a computer-implemented method includes receiving a sensor signal from a sensor, and in response to the sensor signal, controlling a fluidic source to provide a fluidic input signal to a fluidic circuit. The fluidic amplifier may then amplify the fluidic input signal to provide a haptic signal to a person.

In some examples, a system includes at least one physical processor; physical memory comprising computer-executable instructions that, when executed by the physical processor, cause the physical processor to receive a sensor signal, which may be an electrical sensor signal, and to generate a fluidic signal (e.g., in response to the received sensor signal). The method may further include amplifying the fluidic signal using a fluidic amplifier, and providing an output of the fluidic amplifier output to a device, such as a haptic device.

In some examples, a non-transitory computer-readable medium includes one or more computer-executable instructions that, when executed by at least one processor of a computing device, cause the computing device to receive a sensor signal, which may be an electrical sensor signal, and to generate a fluidic signal (e.g., in response to the received sensor signal). The method may further include amplifying the fluidic signal using a fluidic amplifier, and providing an output of the fluidic amplifier output to a device, such as a haptic device.

In some examples, a computer-implemented method, for example for providing haptic feedback may include to receive a sensor signal, which may be an electrical sensor signal, and to generate a fluidic signal (e.g., in response to the received sensor signal). The method may further include amplifying the fluidic signal using a fluidic amplifier, and providing an output of the fluidic amplifier output to a device, such as a haptic device.

In some examples, a system for augmented reality may include several modules stored in memory, including a module for receiving a sensor signal, which may be an electrical sensor signal, determining a haptic feedback based on the sensor signal, and to generate a fluidic signal (e.g., based on the determined haptic feedback). The method may further include amplifying the fluidic signal using a fluidic amplifier, and providing an output of the fluidic amplifier output to a device, such as a haptic device.

In some examples, the above-described method may be encoded as computer-readable instructions on a computer-readable medium. For example, a computer-readable medium may include one or more computer-executable instructions that, when executed by at least one processor of a computing device, may cause the computing device to receive a sensor signal, which may be an electrical sensor signal, and to generate a fluidic signal (e.g., in response to the received sensor signal). The method may further include amplifying the fluidic signal using a fluidic amplifier, and providing an output of the fluidic amplifier output to a device, such as a haptic device.

In some examples, a system includes a device, such as a fluidic device as described in examples herein, at least one physical processor, and physical memory comprising computer-executable instructions that, when executed by the physical processor, cause the physical processor to control a fluidic input signal to a fluidic circuit. In some examples, a fluidic system includes a fluidic input source (e.g., a controlled fluidic input), and a fluidic load, wherein the fluidic input source is connected through a fluidic amplifier to the fluidic load, whereby the response time associated with driving the fluidic load is reduced by the use of the amplifier. In some examples, a method of reducing the response time associated with driving a fluidic load includes providing a fluidic amplifier receiving a fluidic input, and providing a fluidic output to the fluidic load.

In some examples, a non-transitory computer-readable medium includes one or more computer-executable instructions that, when executed by at least one processor of a computing device, cause the computing device to control a fluidic input signal. The fluidic input signal may be provided to a fluidic circuit which may amplify the fluidic input signal to provide a fluidic output signal to a fluidic load. A fluidic load may include, for example, an actuator such as a haptic device.

In some examples, a computer-implemented method for providing a haptic signal may include electrical control of a fluidic pump, aperture, or other flow restriction (e.g., a valve). In some examples, a system for fluidic provision of haptic feedback may include several modules stored in memory, including a module for controlling a fluidic input signal to a fluidic circuit. In some examples, an example method may be encoded as computer-readable instructions on a computer-readable medium. For example, a computer-readable medium may include one or more computer-executable instructions that, when executed by at least one processor of a computing device, may cause the computing device to control a fluidic input signal provided to a fluidic circuit. A fluidic circuit may include a fluidic difference circuit configured to provide a fluidic difference signal based on a difference between the first fluidic input signal and the second fluidic input signal. In some examples, the difference between the first fluidic input signal and the second fluidic input signal may be a pressure difference. A fluidic circuit may include a fluidic buffer amplifier configured to amplify the flow rate and/or pressure of a fluidic signal, to provide a fluidic output signal. In some examples, a buffer amplifier may provide appreciable flow amplification while not appreciably amplifying the pressure of the fluidic signal, to provide the fluidic output signal. The fluidic output signal may be provided to a fluidic load, which may include a haptic device. In some examples, a method may further include providing a fluidic circuit that includes a pair of fluidic valves and may further include using a fluidic flow mirror to balance flows to each of the pair of fluidic devices. In some examples, a device includes a fluidic amplifier stage, configured to receive a fluidic input and provide a fluidic output. A device may further include one or more additional fluidic amplifier stages (which may also be referred to as amplifier stages herein), for example a second fluidic amplifier stage, configured to receive the fluidic output from the first (or input) amplifier stage and provide a second stage fluidic output. In some examples, a third fluidic amplifier stage may be configured to receive the second stage fluidic output and provide a third stage fluidic output.

In some examples, a device includes a fluidic circuit configured to receive a fluidic input, and provide a fluidic output based on the fluidic input. In some examples, the fluidic output may be approximately linearly dependent on the fluidic input. In some examples, a fluidic output may have an output flow rate that is based on (and in some examples approximately proportional to) a fluidic input pressure. In some examples, a fluidic output may be a difference signal that is based on (e.g., correlated with) a difference between a fluidic input and a fluidic bias input (e.g., a fluidic input pressure and a fluidic bias pressure). A device may include a fluidic amplifier, configured to receive, for example, a fluidic difference signal and provide a device output based on the fluidic difference signal.

In some examples, a method includes receiving, by a fluidic circuit, an input signal (e.g., having a pressure, flow rate, mechanical displacement, or some combination thereof), and generating an output signal (e.g., having a pressure, flow rate, mechanical displacement, or some combination thereof). The fluidic circuit may include at least one fluidic valve, such as a relative area fluidic valve. The output signal may be substantially proportional to the input signal, or may be driven to saturation (e.g., approximately equal to the source or drain pressure supplied to the fluidic circuit). For example, an output flow rate and/or output pressure may be substantially proportional to an input flow rate and/or input pressure. In some examples, a method is performed using, for example, partial or complete actuation of at least one fluidic valve, for example a relative area valve. In some examples, a fluidic input may be generated by a mechanical input (such as a pressure), an electrically generated flow and/or pressure, or other mechanism or combination thereof. In some examples, an output pressure and/or an output flow rate may be used to generate a mechanical output, such as an actuation, haptic feedback or other human-perceptible output. In some examples, methods may include pressure-based feedback. Examples also include apparatus and systems configured to perform fluidic amplification by such methods.

In some examples, a device includes a multi-stage fluidic amplifier configured to, for example, amplify a small input flow into a large output flow. An example fluidic circuit may include a plurality of fluidic amplification stages connected in series so that the overall fluidic gain may be the product of the individual stage gains. The first stage may have a fluidic input directed to the gates of a pair of fluidic valves. The pair of fluidic valves may include a normally open fluidic transistor and a normally closed fluidic transistor. The fluidic input may have a high pressure but a low flow rate. For example, the fluidic input may pass through an orifice inflow choke as it leaves the fluidic signal generator. The output from the first fluidic amplifier stage ("first stage") is then passed to the input of a second fluidic amplifier stage ("second stage"). In some examples, the output of the first stage may be located between the pair of fluidic transistors. The second stage may have a similar configuration to the first stage, though the physical dimensions of the fluidic valves and fluid channels of the second stage may scale upwards based on the expected amplified flow rates. A size parameter (e.g., a flow channel area) may scale based on the expected flow gain of an amplifier stage. Third, fourth, etc. fluidic amplifier stages may be added as desired in a cascade amplifier configuration, for example to obtain additional fluidic gain and/or larger flow rates. In some examples, an amplifier stage may be based on a single fluidic transistor in combination with a load, which may reduce fill time.

A fluidic load may comprise a pressure storage device, such as a balloon, cylinder, or other pressure-driven actuator. A fluidic load may also include a leakage and/or drainage component, and may have an inherent or otherwise included load resistance. A fluidic load may include one or more of; a flow resistor, a pressure or flow storage device, a leakage component, a drainage component, a return channel to a fluidic amplifier, or a return channel to a system drain. A fluidic load may include a transducer (such as a sensor) or actuator, for example configured to convert a flow and/or pressure to a mechanical displacement, mechanical vibration, acoustic signal (including an ultrasound signal or a very low frequency acoustic signal), electrical signal, or other signal. In some examples, the device fluidic output (e.g., output flow and/or pressure) may be based on (e.g., may scale with) the fluidic input (e.g., input flow and/or pressure). For example devices may function as an analog fluidic amplifier, such as a linear fluidic amplifier or a substantially linear amplifier. In some examples, the output of a fluidic amplifier may be saturated (or nearly saturated, for example, to approximately external source and drain pressures) to obtain a digital-like on/off response. A fluidic load may include a volume of fluid that may be pressurized and/or have flow driven through it. A fluidic load may include a haptic or other mechanical actuator, and in some cases may include a constant volume that is pressurized, another amplifier (such as another amplifier input), a compartment containing a sensor, or the like.

In some examples, a fluidic circuit may have an output, an input, and a bias input, wherein the output is based on the difference between the input and the bias input. In some examples, an apparatus includes a fluidic differential amplifier. In some examples, a method of fluidic input includes provision of feedback between a fluidic output and a fluidic input. In some examples, fluidic feedback may include negative fluidic input, which may be used to achieve one or more of: reducing fluidic gain, improving amplification linearity, circuit stabilization, or other performance modification. In some examples, fluidic feedback may include fluidic positive feedback, which may be used to achieve one or more of: increased fluidic gain, output saturation, output latching (including output pseudo-latching), oscillation, or other performance modification. Fluidic feedback may include provision of a fluid channel fluidically interconnecting an output to an input. Negative fluidic feedback may provide a signal to the circuit input that tends to reduce the output signal that provides the negative fluidic feedback.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 1500 in FIG. 15. Other artificial reality systems may include a NED that also provides visibility into the real world (e.g., augmented-reality system 1600 in FIG. 16) or that visually immerses a user in an artificial reality (e.g., virtual-reality system 1700 in FIG. 17). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
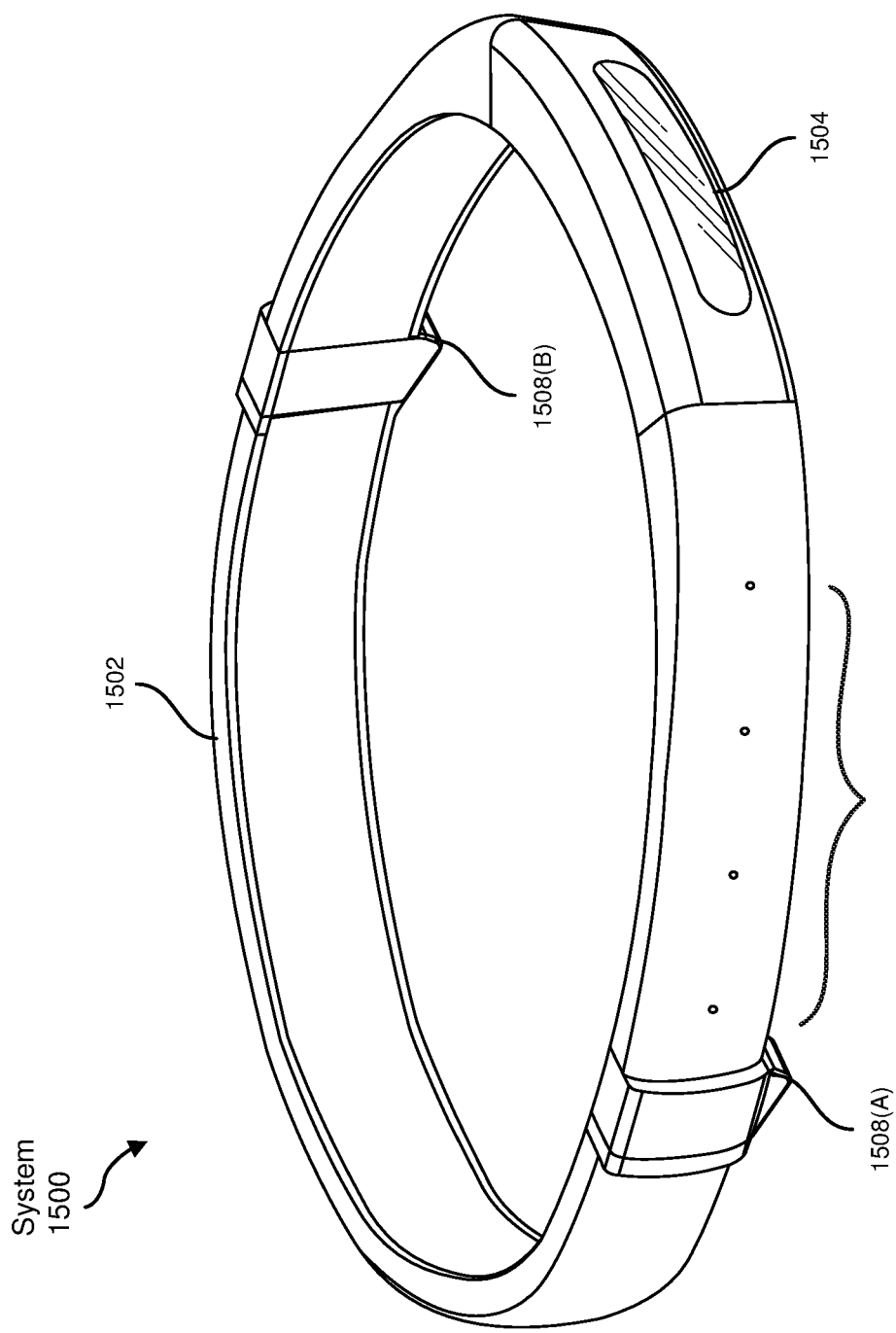
FIG. 15 is an illustration of an exemplary artificial-reality headband that may be used in connection with embodiments of this disclosure.

Turning to FIG. 15, augmented-reality system 1500 generally represents a wearable device dimensioned to fit about a body part (e.g., a head) of a user. As shown in FIG. 15, system 1500 may include a frame 1502 and a camera assembly 1504 that is coupled to frame 1502 and configured to gather information about a local environment by observing the local environment. Augmented-reality system 1500 may also include one or more audio devices, such as output audio transducers 1508(A) and 1508(B) and input audio transducers 1510. Output audio transducers 1508(A) and 1508(B) may provide audio feedback and/or content to a user, and input audio transducers 1510 may capture audio in a user's environment.

As shown, augmented-reality system 1500 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1500 may not include a NED, augmented-reality system 1500 may include other types of screens or visual feedback devices (e.g., a display screen integrated into a side of frame 1502).

Figure 16:
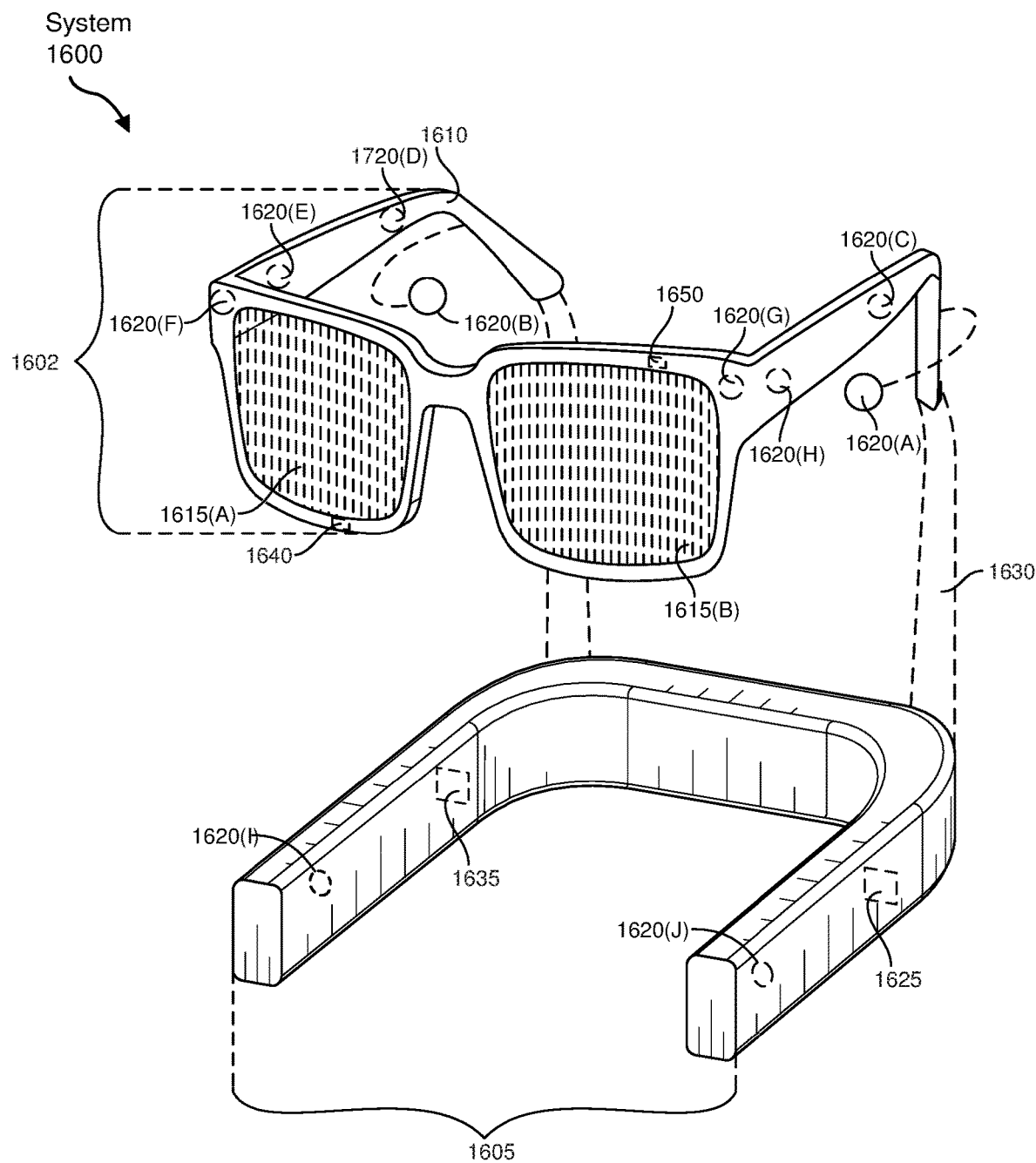
FIG. 16 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 16, augmented-reality system 1600 may include an eyewear device 1602 with a frame 1610 configured to hold a left display device 1615(A) and a right display device 1615(B) in front of a user's eyes. Display devices 1615(A) and 1615(B) may act together or independently to present an image or series of images to a user. While augmented-reality system 1600 includes two displays, embodiments of this disclosure may be implemented in augmented-reality systems with a single NED or more than two NEDs.

In some embodiments, augmented-reality system 1600 may include one or more sensors, such as sensor 1640. Sensor 1640 may generate measurement signals in response to motion of augmented-reality system 1600 and may be located on substantially any portion of frame 1610. Sensor 1640 may represent a position sensor, an inertial measurement unit (IMU), a depth camera assembly, or any combination thereof. In some embodiments, augmented-reality system 1600 may or may not include sensor 1640 or may include more than one sensor. In embodiments in which sensor 1640 includes an IMU, the IMU may generate calibration data based on measurement signals from sensor 1640. Examples of sensor 1640 may include, without limitation, accelerometers, gyroscopes, magnetometers, other suitable types of sensors that detect motion, sensors used for error correction of the IMU, or some combination thereof.

Augmented-reality system 1600 may also include a microphone array with a plurality of acoustic transducers 1620(A)-1620(J), referred to collectively as acoustic transducers 1620. Acoustic transducers 1620 may be transducers that detect air pressure variations induced by sound waves. Each acoustic transducer 1620 may be configured to detect sound and convert the detected sound into an electronic format (e.g., an analog or digital format). The microphone array in FIG. 2 may include, for example, ten acoustic transducers: 1620(A) and 1620(B), which may be designed to be placed inside a corresponding ear of the user, acoustic transducers 1620(C), 1620(D), 1620(E), 1620(F), 1620(G), and 1620(H), which may be positioned at various locations on frame 1610, and/or acoustic transducers 1620(I) and 1620(J), which may be positioned on a corresponding neckband 1605.

In some embodiments, one or more of acoustic transducers 1620(A)-(F) may be used as output transducers (e.g., speakers). For example, acoustic transducers 1620(A) and/or 1620(B) may be earbuds or any other suitable type of headphone or speaker.

The configuration of acoustic transducers 1620 of the microphone array may vary. While augmented-reality system 1600 is shown in FIG. 16 as having ten acoustic transducers 1620, the number of acoustic transducers 1620 may be greater or less than ten. In some embodiments, using higher numbers of acoustic transducers 1620 may increase the amount of audio information collected and/or the sensitivity and accuracy of the audio information. In contrast, using a lower number of acoustic transducers 1620 may decrease the computing power required by the controller 1650 to process the collected audio information. In addition, the position of each acoustic transducer 1620 of the microphone array may vary. For example, the position of an acoustic transducer 1620 may include a defined position on the user, a defined coordinate on frame 1610, an orientation associated with each acoustic transducer, or some combination thereof.

Acoustic transducers 1620(A) and 1620(B) may be positioned on different parts of the user's ear, such as behind the pinna or within the auricle or fossa. Or, there may be additional acoustic transducers on or surrounding the ear in addition to acoustic transducers 1620 inside the ear canal. Having an acoustic transducer positioned next to an ear canal of a user may enable the microphone array to collect information on how sounds arrive at the ear canal. By positioning at least two of acoustic transducers 1620 on either side of a user's head (e.g., as binaural microphones), augmented-reality device 1600 may simulate binaural hearing and capture a 3D stereo sound field around about a user's head. In some embodiments, acoustic transducers 1620(A) and 1620(B) may be connected to augmented-reality system 1600 via a wired connection 1630, and in other embodiments, acoustic transducers 1620(A) and 1620(B) may be connected to augmented-reality system 1600 via a wireless connection (e.g., a Bluetooth connection). In still other embodiments, acoustic transducers 1620(A) and 1620(B) may not be used at all in conjunction with augmented-reality system 1600.

Acoustic transducers 1620 on frame 1610 may be positioned along the length of the temples, across the bridge, above or below display devices 1615(A) and 1615(B), or some combination thereof. Acoustic transducers 1620 may be oriented such that the microphone array is able to detect sounds in a wide range of directions surrounding the user wearing the augmented-reality system 1600. In some embodiments, an optimization process may be performed during manufacturing of augmented-reality system 1600 to determine relative positioning of each acoustic transducer 1620 in the microphone array.

In some examples, augmented-reality system 1600 may include or be connected to an external device (e.g., a paired device), such as neckband 1605. Neckband 1605 generally represents any type or form of paired device. Thus, the following discussion of neckband 1605 may also apply to various other paired devices, such as charging cases, smart watches, smart phones, wrist bands, other wearable devices, hand-held controllers, tablet computers, laptop computers and other external compute devices, etc.

As shown, neckband 1605 may be coupled to eyewear device 1602 via one or more connectors. The connectors may be wired or wireless and may include electrical and/or non-electrical (e.g., structural) components. In some cases, eyewear device 1602 and neckband 1605 may operate independently without any wired or wireless connection between them. While FIG. 16 illustrates the components of eyewear device 1602 and neckband 1605 in example locations on eyewear device 1602 and neckband 1605, the components may be located elsewhere and/or distributed differently on eyewear device 1602 and/or neckband 1605. In some embodiments, the components of eyewear device 1602 and neckband 1605 may be located on one or more additional peripheral devices paired with eyewear device 1602, neckband 1605, or some combination thereof. Furthermore, Pairing external devices, such as neckband 1605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1600 may be provided by a paired device or shared between a paired device and an eyewear device, thus reducing the weight, heat profile, and form factor of the eyewear device overall while still retaining desired functionality. For example, neckband 1605 may allow components that would otherwise be included on an eyewear device to be included in neckband 1605 since users may tolerate a heavier weight load on their shoulders than they would tolerate on their heads. Neckband 1605 may also have a larger surface area over which to diffuse and disperse heat to the ambient environment. Thus, neckband 1605 may allow for greater battery and computation capacity than might otherwise have been possible on a stand-alone eyewear device. Since weight carried in neckband 1605 may be less invasive to a user than weight carried in eyewear device 1602, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 1605 may be communicatively coupled with eyewear device 1602 and/or to other devices. These other devices may provide certain functions (e.g., tracking, localizing, depth mapping, processing, storage, etc.) to augmented-reality system 1600. In the embodiment of FIG. 16, neckband 1605 may include two acoustic transducers (e.g., 1620(I) and 1620(J)) that are part of the microphone array (or potentially form their own microphone subarray). Neckband 1605 may also include a controller 1625 and a power source 1635.

Acoustic transducers 1620(*I*) and 1620(J) of neckband 1605 may be configured to detect sound and convert the detected sound into an electronic format (analog or digital). In the embodiment of FIG. 16, acoustic transducers 1620(I) and 1620(J) may be positioned on neckband 1605, thereby increasing the distance between the neckband acoustic transducers 1620(I) and 1620(J) and other acoustic transducers 1620 positioned on eyewear device 1602. In some cases, increasing the distance between acoustic transducers 1620 of the microphone array may improve the accuracy of beamforming performed via the microphone array. For example, if a sound is detected by acoustic transducers 1620(C) and 1620(D) and the distance between acoustic transducers 1620(C) and 1620(D) is greater than, for example, the distance between acoustic transducers 1620(D) and 1620(E), the determined source location of the detected sound may be more accurate than if the sound had been detected by acoustic transducers 1620(D) and 1620(E).

Controller 1625 of neckband 1605 may process information generated by the sensors on 1605 and/or augmented-reality system 1600. For example, controller 1625 may process information from the microphone array that describes sounds detected by the microphone array. For each detected sound, controller 1625 may perform a direction-of-arrival (DOA) estimation to estimate a direction from which the detected sound arrived at the microphone array. As the microphone array detects sounds, controller 1625 may populate an audio data set with the information. In embodiments in which augmented-reality system 1600 includes an inertial measurement unit, controller 1625 may compute all inertial and spatial calculations from the IMU located on eyewear device 1602. A connector may convey information between augmented-reality system 1600 and neckband 1605 and between augmented-reality system 1600 and controller 1625. The information may be in the form of optical data, electrical data, wireless data, or any other transmittable data form. Moving the processing of information generated by augmented-reality system 1600 to neckband 1605 may reduce weight and heat in eyewear device 1602, making it more comfortable to the user.

Power source 1635 in neckband 1605 may provide power to eyewear device 1602 and/or to neckband 1605. Power source 1635 may include, without limitation, lithium ion batteries, lithium-polymer batteries, primary lithium batteries, alkaline batteries, or any other form of power storage. In some cases, power source 1635 may be a wired power source. Including power source 1635 on neckband 1605 instead of on eyewear device 1602 may help better distribute the weight and heat generated by power source 1635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1700 in FIG. 17, that mostly or completely covers a user's field of view. Virtual-reality system 1700 may include a front rigid body 1702 and a band 1704 shaped to fit around a user's head. Virtual-reality system 1700 may also include output audio transducers 1706(A) and 1706(B). Furthermore, while not shown in FIG. 17, front rigid body 1702 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented-reality system 1700 and/or virtual-reality system 1700 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1600 and/or virtual-reality system 1700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1500, augmented-reality system 1600, and/or virtual-reality system 1700 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 15 and 17, output audio transducers 1508(A), 1508(B), 1706(A), and 1706(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1510 may include condenser microphones, dynamic microphones, ribbon microphones, and/or any other type or form of input transducer. In some embodiments, a single transducer may be used for both audio input and audio output.

Figure 17:
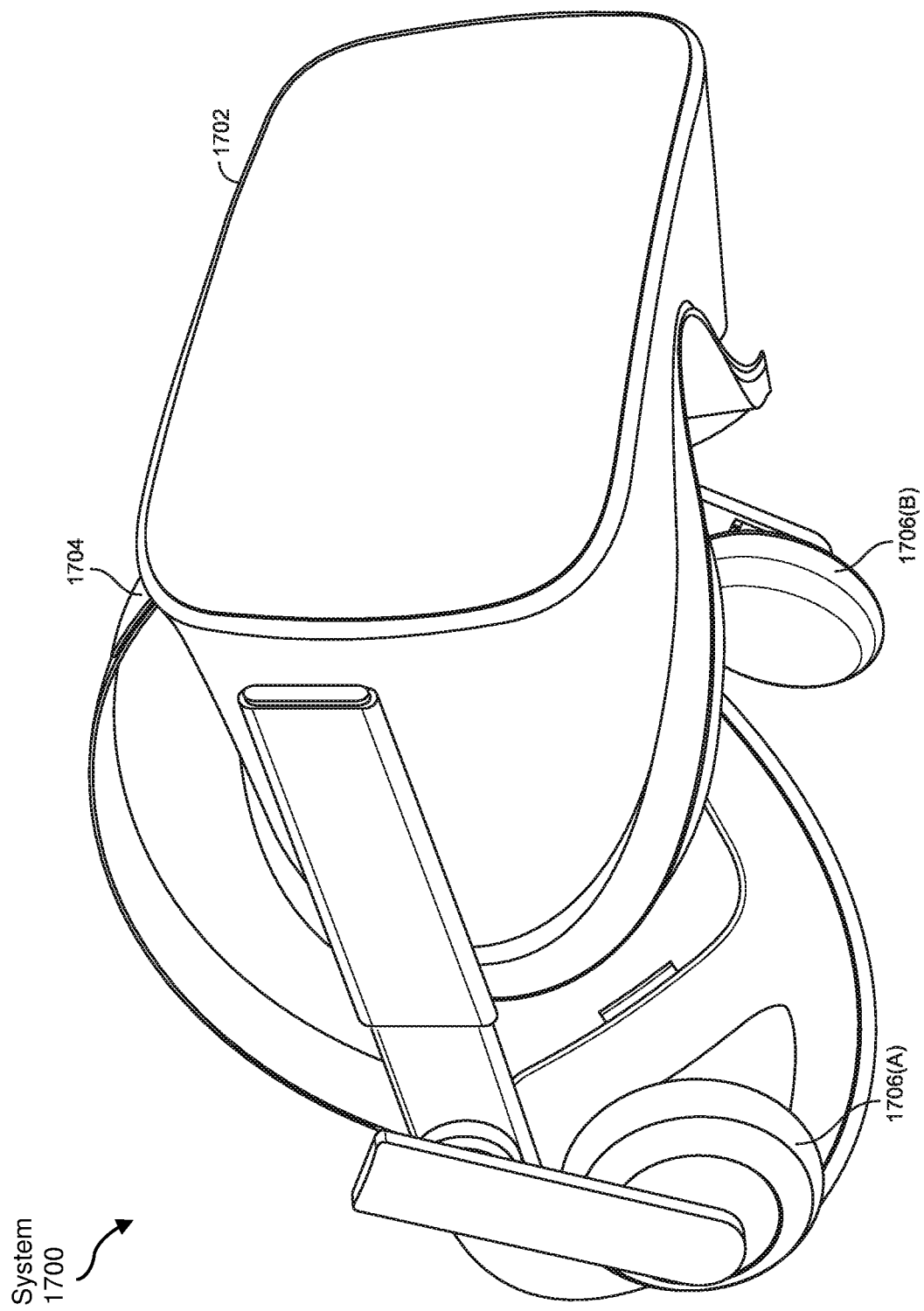
FIG. 17 is an illustration of an exemplary virtual-reality headset that may be used in connection with embodiments of this disclosure.

While not shown in FIGS. 15-17, artificial reality systems may include tactile (e.g., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 1500, 1600, and 1700 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 18:
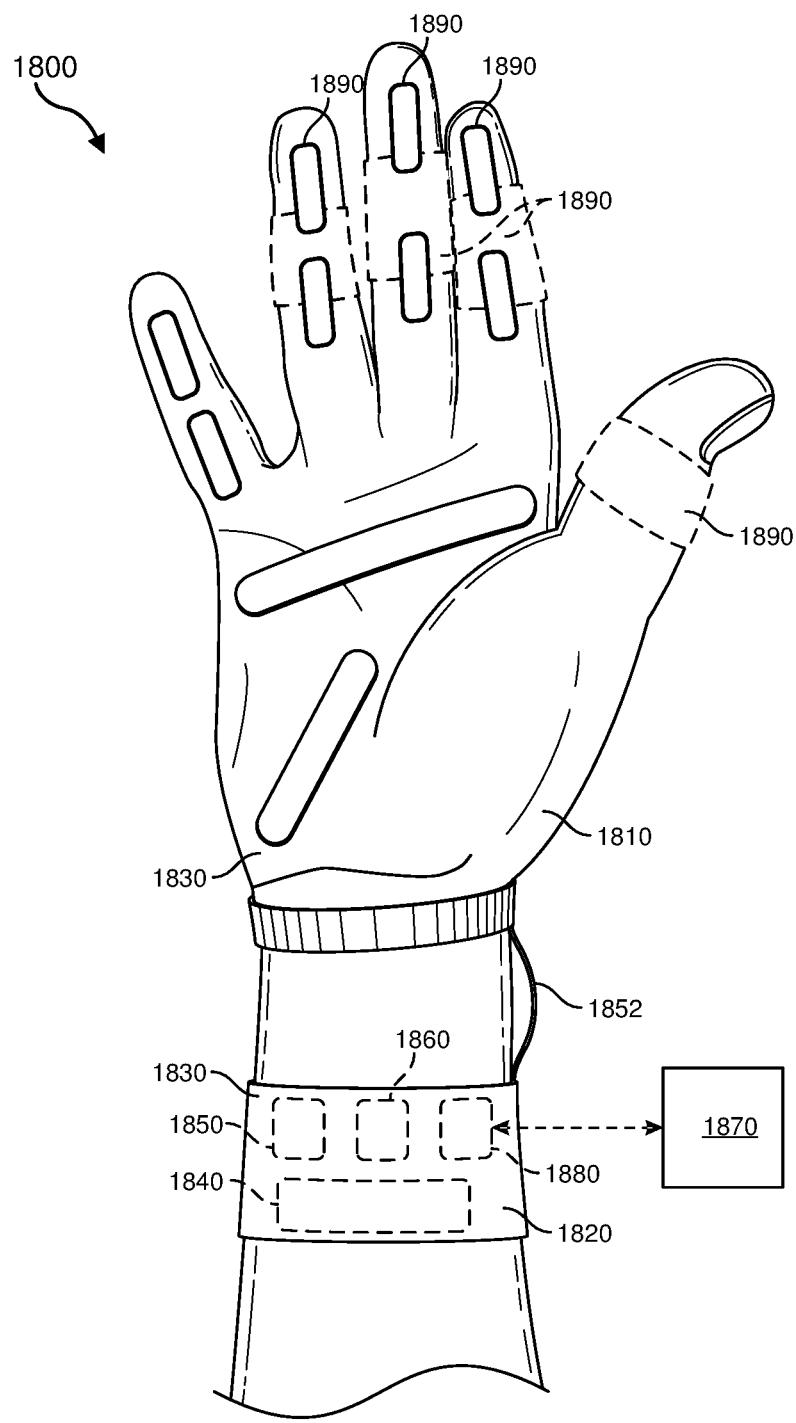
FIG. 18 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 18 illustrates a vibrotactile system 1800 in the form of a wearable glove (haptic device 1810) and wristband (haptic device 1820). Haptic device 1810 and haptic device 1820 are shown as examples of wearable devices that include a flexible, wearable textile material 1830 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1840 may be positioned at least partially within one or more corresponding pockets formed in textile material 1830 of vibrotactile system 1800. Vibrotactile devices 1840 may be positioned in locations to provide a vibrating sensation (e.g., haptic feedback) to a user of vibrotactile system 1800. For example, vibrotactile devices 1840 may be positioned to be against the user's finger(s), thumb, or wrist, as shown in FIG. 18. Vibrotactile devices 1840 may, in some examples, be sufficiently flexible to conform to or bend with the user's corresponding body part(s).

A power source 1850 (e.g., a battery) for applying a voltage to the vibrotactile devices 1840 for activation thereof may be electrically coupled to vibrotactile devices 1840, such as via conductive wiring 1852. In some examples, each of vibrotactile devices 1840 may be independently electrically coupled to power source 1850 for individual activation. In some embodiments, a processor 1860 may be operatively coupled to power source 1850 and configured (e.g., programmed) to control activation of vibrotactile devices 1840.

Vibrotactile system 1800 may be implemented in a variety of ways. In some examples, vibrotactile system 1800 may be a standalone system with integral subsystems and components for operation independent of other devices and systems. As another example, vibrotactile system 1800 may be configured for interaction with another device or system 1870. For example, vibrotactile system 1800 may, in some examples, include a communications interface 1880 for receiving and/or sending signals to the other device or system 1870. The other device or system 1870 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1880 may enable communications between vibrotactile system 1800 and the other device or system 1870 via a wireless (e.g., Wi-Fi, Bluetooth, cellular, radio, etc.) link or a wired link. If present, communications interface 1880 may be in communication with processor 1860, such as to provide a signal to processor 1860 to activate or deactivate one or more of the vibrotactile devices 1840.

Vibrotactile system 1800 may optionally include other subsystems and components, such as touch-sensitive pads 1890, pressure sensors, motion sensors, position sensors, lighting elements, and/or user interface elements (e.g., an on/off button, a vibration control element, etc.). During use, vibrotactile devices 1840 may be configured to be activated for a variety of different reasons, such as in response to the user's interaction with user interface elements, a signal from the motion or position sensors, a signal from the touch-sensitive pads 1890, a signal from the pressure sensors, a signal from the other device or system 1870, etc.

Although power source 1850, processor 1860, and communications interface 1880 are illustrated in FIG. 18 as being positioned in haptic device 1820, the present disclosure is not so limited. For example, one or more of power source 1850, processor 1860, or communications interface 1880 may be positioned within haptic device 1810 or within another wearable textile.

Figure 19:
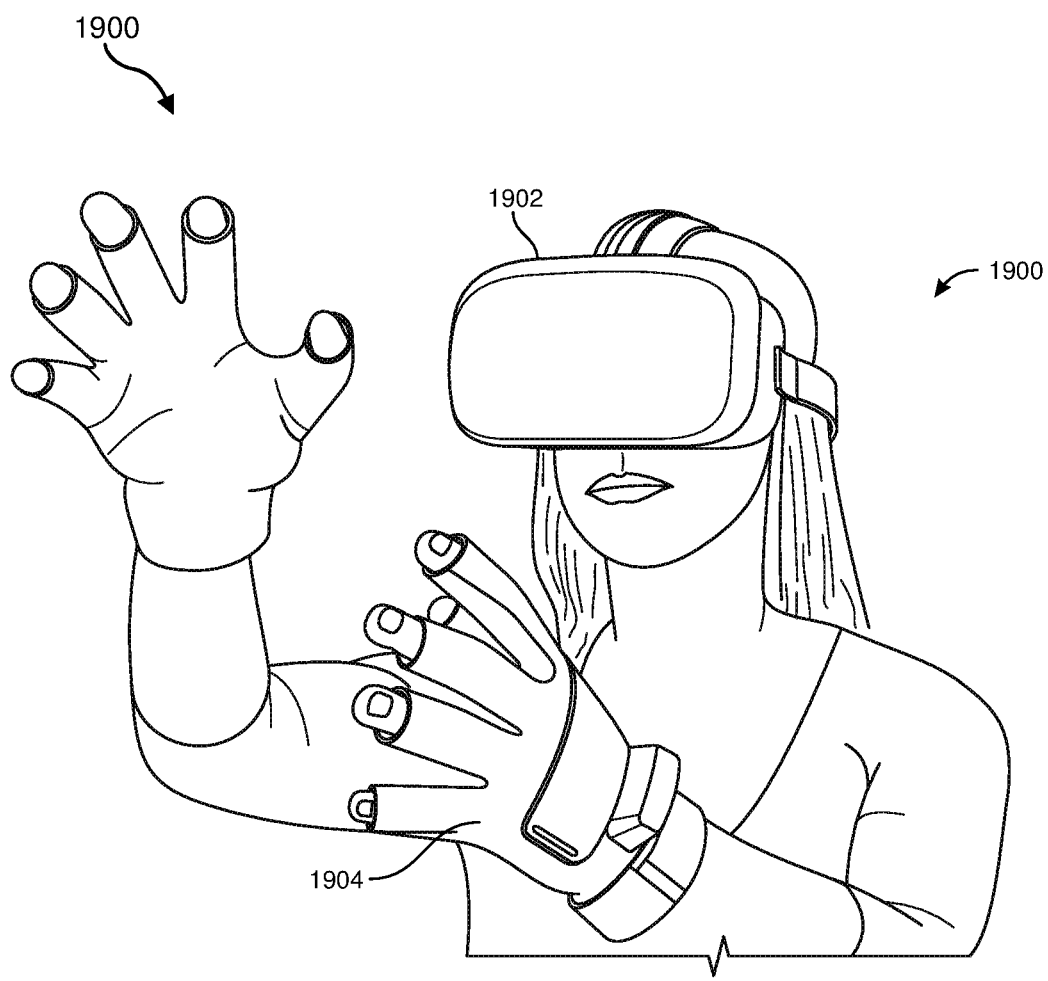
FIG. 19 is an illustration of an exemplary virtual-reality environment according to embodiments of this disclosure.

Haptic wearables, such as those shown in and described in connection with FIG. 18, may be implemented in a variety of types of artificial-reality systems and environments. FIG. 19 shows an example artificial reality environment 1900 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1902 generally represents any type or form of virtual-reality system, such as virtual-reality system 1700 in FIG. 17. Haptic device 1904 generally represents any type or form of wearable device, worn by a use of an artificial reality system, that provides haptic feedback to the user to give the user the perception that he or she is physically engaging with a virtual object. In some embodiments, haptic device 1904 may provide haptic feedback by applying vibration, motion, and/or force to the user. For example, haptic device 1904 may limit or augment a user's movement. To give a specific example, haptic device 1904 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1904 to send action requests to a console. Examples of action requests include, without limitation, requests to start an application and/or end the application and/or requests to perform a particular action within the application.

Figure 20:
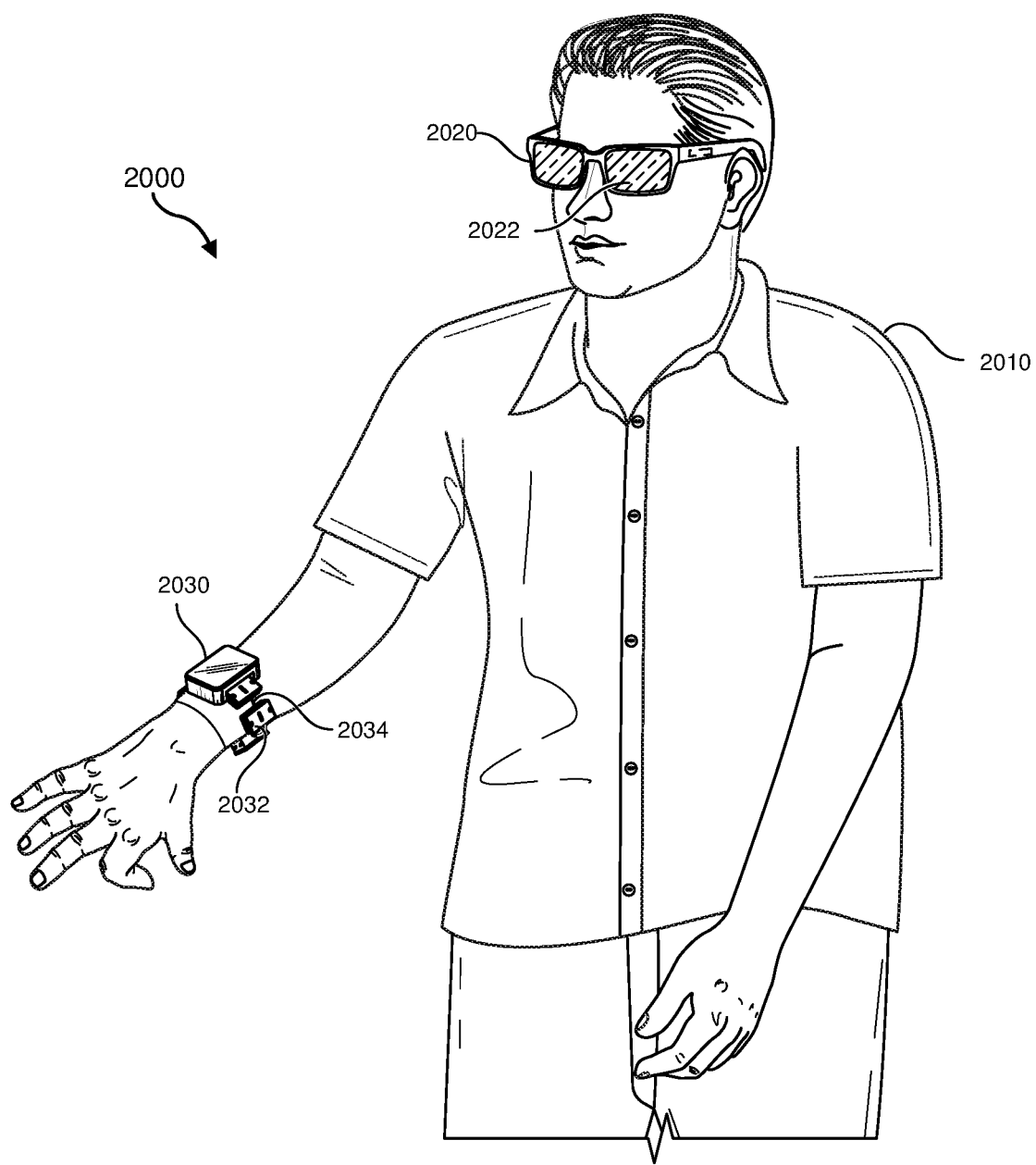
FIG. 20 is an illustration of an exemplary augmented-reality environment according to embodiments of this disclosure.

While haptic interfaces may be used with virtual-reality systems, as shown in FIG. 19, haptic interfaces may also be used with augmented-reality systems, as shown in FIG. 20. FIG. 20 is a perspective view a user 2010 interacting with an augmented-reality system 2000. In this example, user 2010 may wear a pair of augmented-reality glasses 2020 that have one or more displays 2022 and that are paired with a haptic device 2030. Haptic device 2030 may be a wristband that includes a plurality of band elements 2032 and a tensioning mechanism 2034 that connects band elements 2032 to one another.

One or more of band elements 2032 may include any type or form of actuator suitable for providing haptic feedback. For example, one or more of band elements 2032 may be configured to provide one or more of various types of cutaneous feedback, including vibration, force, traction, texture, and/or temperature. To provide such feedback, band elements 2032 may include one or more of various types of actuators. In one example, each of band elements 2032 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1810, 1820, 1904, and 2030 may include any suitable number and/or type of haptic transducer, sensor, and/or feedback mechanism. For example, haptic devices 1810, 1820, 1904, and 2030 may include one or more mechanical transducers, piezoelectric transducers, and/or fluidic transducers. Haptic devices 1810, 1820, 1904, and 2030 may also include various combinations of different types and forms of transducers that work together or independently to enhance a user's artificial-reality experience. In one example, each of band elements 2032 of haptic device 2030 may include a vibrotactor (e.g., a vibrotactile actuator) configured to vibrate in unison or independently to provide one or more of various types of haptic sensations to a user.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
  a fluidic signal generator;
  a first fluidic amplifier stage, configured to receive a fluidic input from the fluidic signal generator and provide a first stage fluidic output;
  a second fluidic amplifier stage, configured to receive the first stage fluidic output and provide a second stage fluidic output; and
  a fluidic load configured to receive a device fluidic output, the fluidic load comprising a haptic device,
  wherein:
  the first fluidic amplifier stage comprises a fluidic valve, and the fluidic valve includes a source, a gate, and a drain;
  the gate of the fluidic valve is configured to receive the fluidic input through a fluid channel;
  a fluid flow between the source and the drain of the fluidic valve is controllable by the fluidic input;
  the fluidic valve further comprises a movable gate transmission element configured to restrict the fluid flow when the fluid input is received by the gate;
  the second fluidic amplifier stage comprises a second fluidic valve, and the second fluidic valve comprises a second source, a second gate, a second drain, and a second movable gate transmission element; and
  the device fluidic output is based on the second stage fluidic output.

2. The device of claim 1, wherein the device fluidic output has a maximum fluidic output flow rate that is greater than a maximum fluidic input flow rate.

3. The device of claim 1, wherein the device fluidic output is the second stage fluidic output.

4. The device of claim 1, further comprising a third fluidic amplifier stage, configured to receive the second stage fluidic output and provide a third stage fluidic output, wherein the device fluidic output is the third stage fluidic output.

5. The device of claim 1, wherein the first fluidic amplifier stage comprises the fluidic valve and a fluidic resistor, wherein the first stage fluidic output is obtained between the fluidic valve and the fluidic resistor.

6. The device of claim 1, wherein the second fluidic amplifier stage includes a second stage fluidic valve, and the first stage fluidic output is coupled to the second stage fluidic valve through a second fluid channel.

7. The device of claim 1, wherein the device is configured to receive the fluidic input through the fluid channel and a fluidic input resistor.

8. A device comprising:
  a fluidic signal generator;
  an input fluidic amplifier stage, configured to receive a fluidic input from the fluidic signal generator and provide a first stage fluidic output;
  an output fluidic amplifier stage, configured to receive a fluidic signal based on the first stage fluidic output and provide a device fluidic output; and
  a haptic device configured to receive the device fluidic output,
  wherein the input fluidic amplifier stage comprises a fluidic valve, and the fluidic valve includes a source, a gate, and a drain,
  the fluidic input is connected to the gate of the fluidic valve through a fluid channel,
  a fluid flow between the source and the drain of the fluidic valve is controlled by the fluidic input,
  the fluidic valve further comprises a movable gate transmission element configured to restrict the fluid flow when the fluid input is received by the gate,
  the output fluidic amplifier stage comprises a second fluidic valve, and the second fluidic valve comprises a second source, a second gate, a second drain, and a second movable gate transmission element, and
  the device fluidic output is based on the fluidic input.

9. The device of claim 8, further comprising an intermediate fluidic amplifier comprising one or more fluidic amplifier stages, wherein the intermediate fluidic amplifier is configured to receive the first stage fluidic output and provide the fluidic signal based on the first stage fluidic output to the output fluidic amplifier stage.

10. The device of claim 8, wherein the input fluidic amplifier stage comprises:
  the fluidic valve; and
  a fluidic resistor, wherein
  the device is configured so that the fluidic input is received at the gate of the fluidic valve, and
  the first stage fluidic output is obtained between the fluidic valve and the fluidic resistor.

11. The device of claim 8, wherein the fluidic input is connected to the input fluidic amplifier stage through a second fluid channel and a fluidic resistor.

12. A method comprising:
  receiving, by a first fluidic amplifier stage, a fluidic input from a fluidic signal generator;
  amplifying the fluidic input using the first fluidic amplifier stage to provide a first stage fluidic output;
  amplifying the first stage fluidic output using at least one further fluidic amplifier stage to provide a device fluidic output; and
  operating a haptic device using the device fluidic output, wherein:
  the first fluidic amplifier stage includes a fluidic valve;
  the fluidic valve comprises a source, a gate, a drain, and a movable gate transmission element configured to restrict a fluid flow between the source and the drain when the fluid input is received by the gate;
  the at least one further fluidic amplifier stage comprises a second fluidic valve; and
  the second fluidic valve comprises a second source, a second gate, a second drain, and a second movable gate transmission element.

13. The method of claim 12, wherein the device fluidic output includes a flow rate appreciably larger than the fluidic input.

14. The method of claim 12, wherein amplifying the fluidic input using the first fluidic amplifier stage comprises amplifying the fluidic input using at least one fluidic valve.

* * * * *